US012373863B2

(12) United States Patent
Løken

(10) Patent No.: US 12,373,863 B2
(45) Date of Patent: Jul. 29, 2025

(54) METHOD AND SYSTEM FOR ENCODING AND DECODING USER IDENTITIES BETWEEN SYSTEMS

(71) Applicant: Kezzler AS, Oslo (NO)

(72) Inventor: Magnar Løken, Oslo (NO)

(73) Assignee: KEZZLER AS, Oslo (NO)

( * ) Notice: Subject to any disclaimer, the term of this patent is extended or adjusted under 35 U.S.C. 154(b) by 184 days.

(21) Appl. No.: 18/105,614

(22) Filed: Feb. 3, 2023

(65) Prior Publication Data

US 2023/0360093 A1 Nov. 9, 2023

(30) Foreign Application Priority Data

May 6, 2022 (NO) .................................. 20220525

(51) Int. Cl.
*G06Q 30/02* (2023.01)
*G06F 21/33* (2013.01)
*H04L 67/306* (2022.01)

(52) U.S. Cl.
CPC ......... *G06Q 30/0281* (2013.01); *G06F 21/33* (2013.01); *H04L 67/306* (2013.01)

(58) Field of Classification Search
CPC .... G06F 21/33; G06Q 30/0281; H04L 67/306
See application file for complete search history.

(56) References Cited

U.S. PATENT DOCUMENTS

2007/0055666 A1* 3/2007 Newbould ............ G06Q 30/02
707/999.009
2007/0058888 A1 3/2007 Newbould et al.
(Continued)

FOREIGN PATENT DOCUMENTS

CA 2 860 017 A1 2/2016
EP 2 282 477 A1 2/2011

OTHER PUBLICATIONS

International Search Report and Written Opinion of the International Searching Authority for International Application No. PCT/NO2023/050105, dated Jun. 28, 2023.
(Continued)

*Primary Examiner* — Mahran Y Abu Roumi
(74) *Attorney, Agent, or Firm* — Birch, Stewart, Kolasch & Birch, LLP

(57) ABSTRACT

A computer implemented method for facilitating communication and information exchange between a first computer system (100) and a second computer system (200), wherein the first computer system (100) is arranged to comprise one or more first user profiles (120) for corresponding one or more unique and internal first user identities (110) for corresponding one or more first consumers (105) the second computer system (200) is arranged to comprise one or more second user profiles (220) for corresponding one or more second unique and internal user identities (210) for one or more the second consumers (205) wherein at least one the first consumer (105) and at least one the second consumer (205) actually is the same person; the method including providing a unique common intermediary user identity (310) whereby the first user identity (110) and the second user identity (210) are mutually bound (800) via the common intermediary user identification (310); wherein the common intermediary user identification (310) is resolved/decoded to first the user identity (110) by the first computer system (100), and wherein the common intermediary user identification (310) is resolved/decoded to the second user identity (210) by the second computer system (200), whereby the information exchange, related to the first user profile (120) of the first consumer (105) or the second user profile (220) of the second consumer (205) between the first computer system (100) and the second computer system (200) is enabled using the common intermediary encoded user iden- (Continued)

tity (310) and take place without exchanging the first and second user identities (110, 210).

14 Claims, 22 Drawing Sheets

(56) References Cited

U.S. PATENT DOCUMENTS

| | | | |
|---|---|---|---|
| 2010/0146586 A1 | 6/2010 | Cho et al. | |
| 2014/0006512 A1* | 1/2014 | Huang | G06Q 30/02 |
| | | | 709/204 |
| 2015/0158192 A1 | 6/2015 | Yang et al. | |
| 2015/0382162 A1* | 12/2015 | Ireland | H04L 51/214 |
| | | | 455/466 |
| 2018/0063259 A1* | 3/2018 | Connelly | H04L 67/306 |
| 2018/0152537 A1* | 5/2018 | Ireland | H04L 67/306 |
| 2019/0372767 A1* | 12/2019 | Mahajan | H04L 51/18 |
| 2023/0100200 A1* | 3/2023 | Evani | H04L 9/3247 |
| | | | 713/185 |
| 2023/0117620 A1* | 4/2023 | Schumacher | H04W 12/40 |
| | | | 726/2 |
| 2024/0257183 A1* | 8/2024 | Proctor, Jr. | G06Q 30/0207 |

OTHER PUBLICATIONS

Norwegian Search Report for Norwegian Application No. 20220525, dated Dec. 5, 2022, with English translation.

\* cited by examiner

Fig. 9   Occurs in second computer System (200)

| Second consumerID 210: CES_ID (internal) | 310: xRef | ! Key |
|---|---|---|
| 45576 | HT556 | 601 |
| 65545 | BX677 | 603 |
| 87765 | AD443 | 601 | xRef = encrypt ( 45576 <> ! 601 ) → # 45576 ! 601 = HT556

Encrypting second user_ID (210) to get intermediate user_ID (310).

Fig. 10   Occurs in first computer System (100)

| First consumerID (110): BOS_ID | 310: xRef | ! Key |
|---|---|---|
| K6006T | HT556 | 601 |
| L3440R | BX677 | 603 |
| M7665F | AD443 | 601 | xRef = encrypt ( K6006T <> ! 601 ) → # K6006T ! 601 = HT556

Fig. 11

Hashing occurs in second computer system (200)

| CE_ID(int) | xRef | Salt |
|---|---|---|
| 76645 | MN231 | 780 |
| 85532 | NN654 | 231 |
| 12003 | AS432 | 654 |

Fig. 12

Occurs in first computer System (100)

| BOS_ID | xRef |
|---|---|
| H7543D | MN231 |
| L3440R | NN654 |
| M7665F | AS432 |

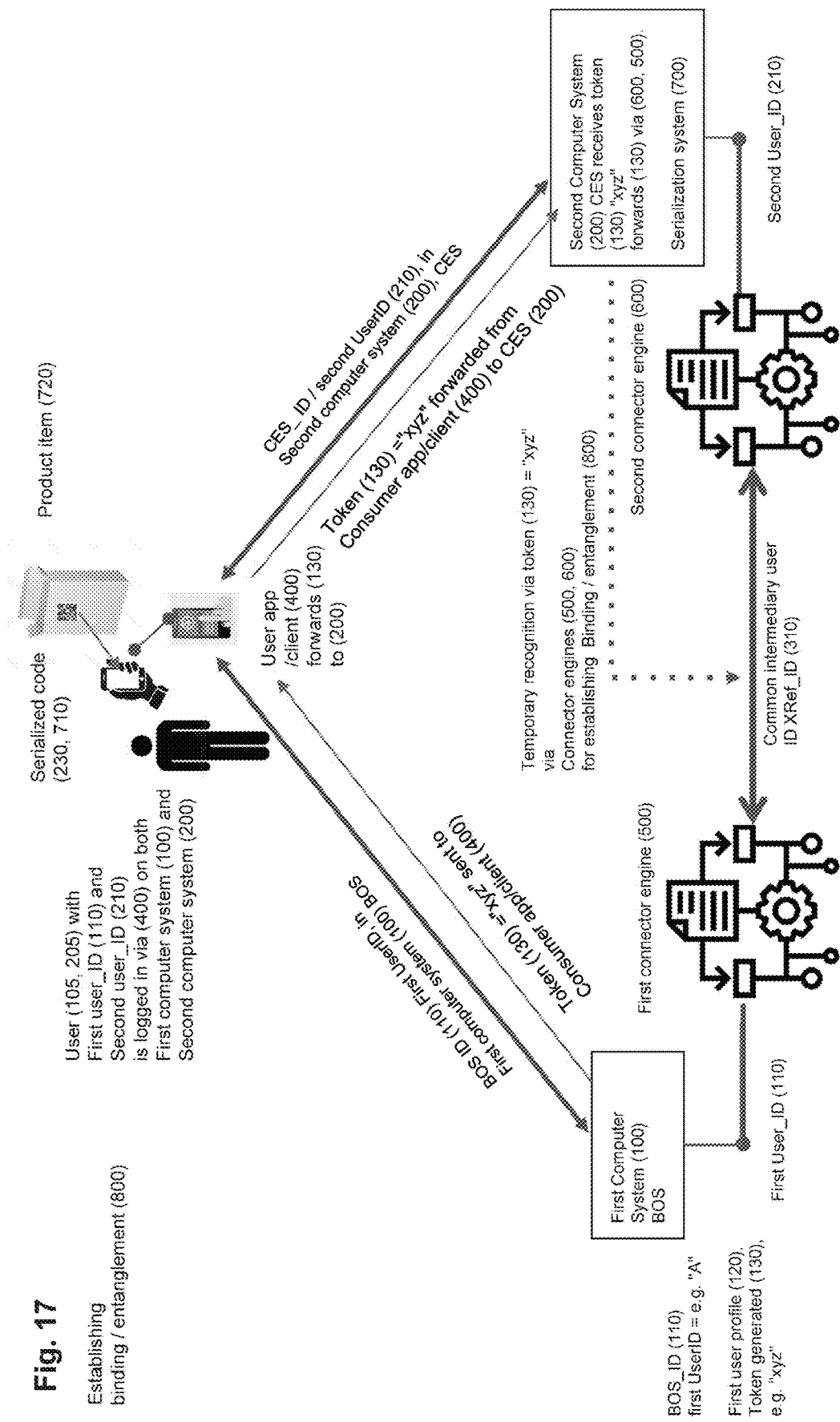

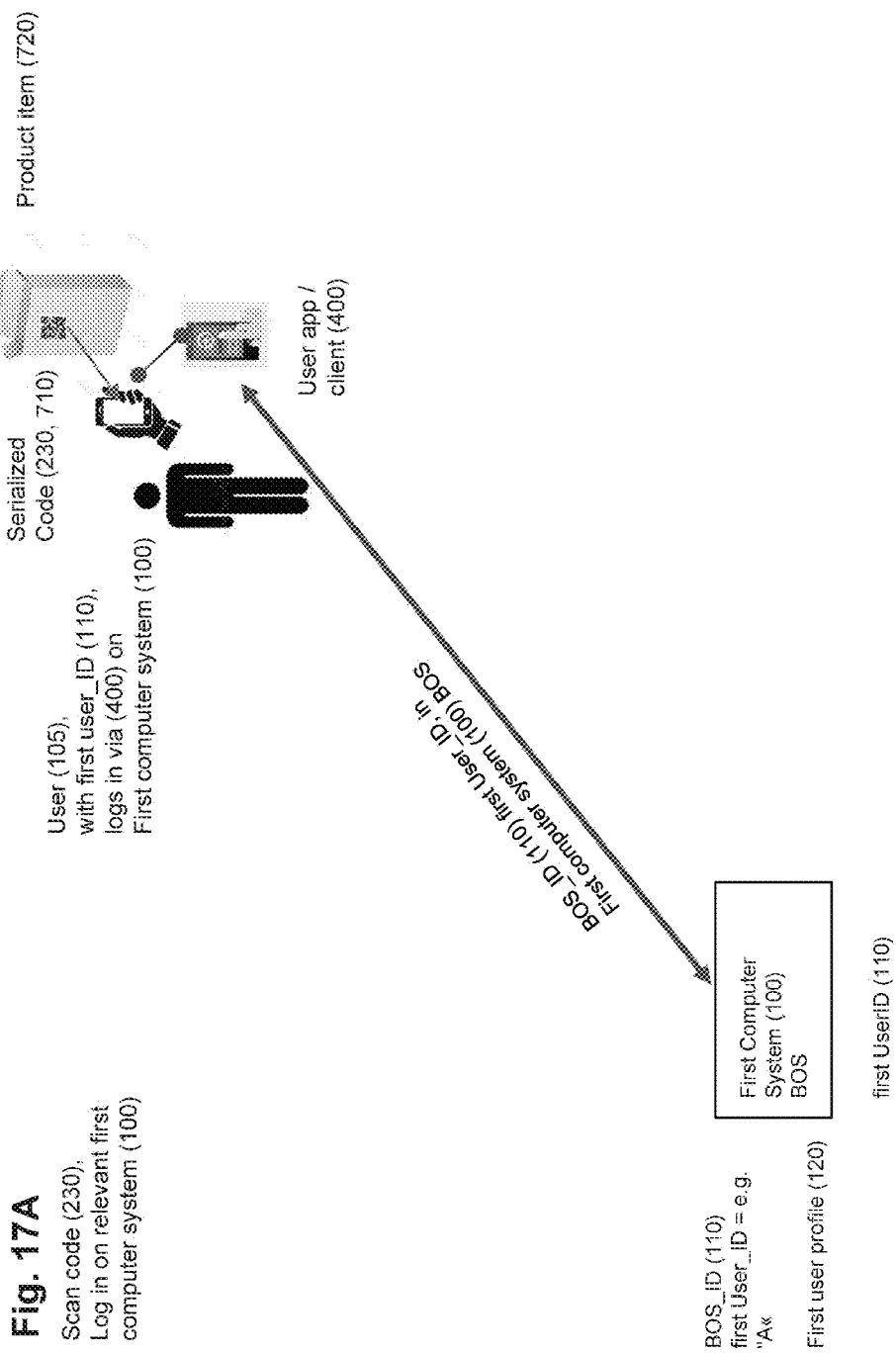

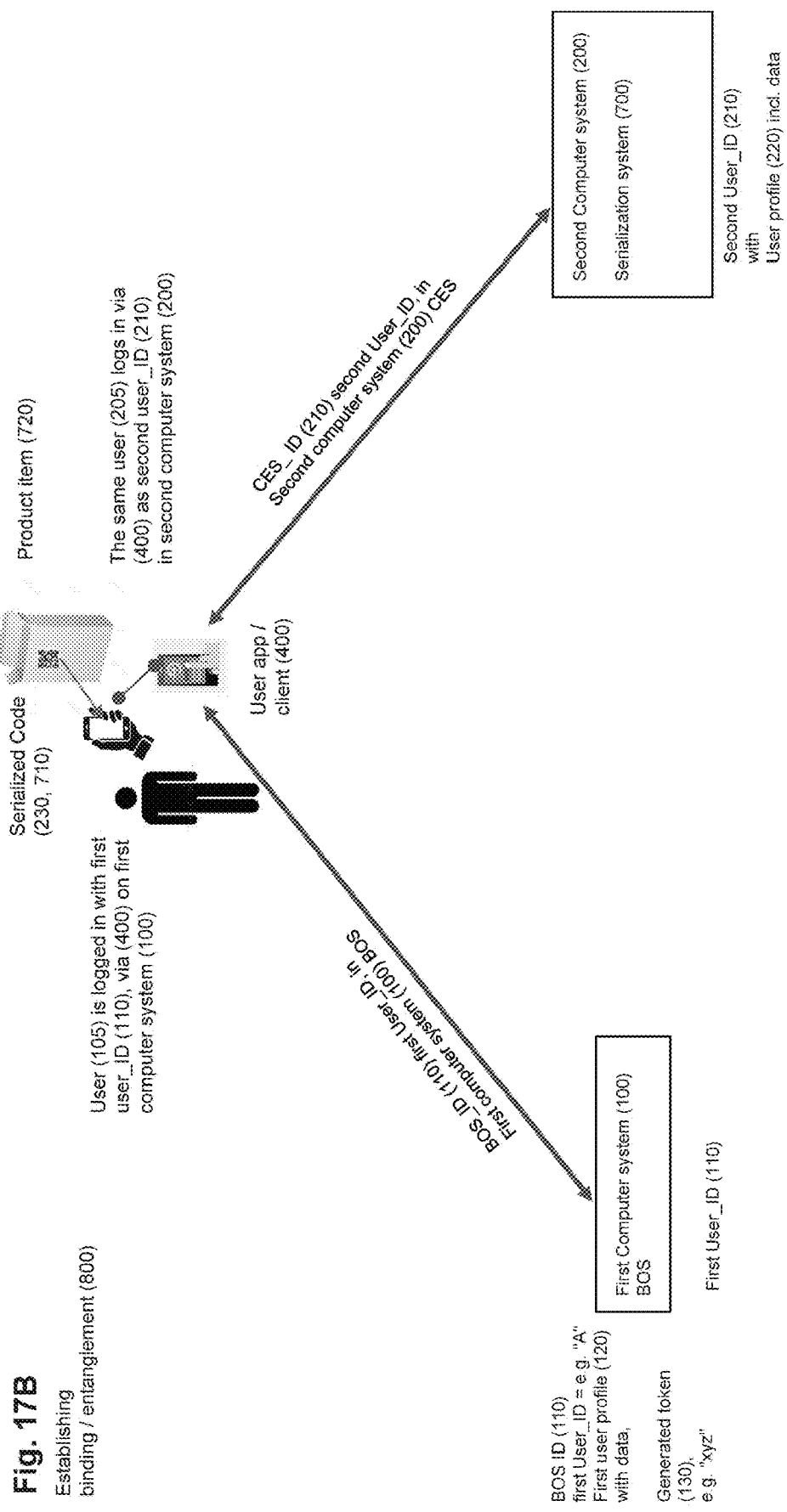

Fig. 17C

Establishing binding / entanglement (800)

First Computer System (100)
BOS generates token (130), e.g. "xyz"

First User_ID (110)

BOS_ID (110)
first User_ID (110) = e.g. "A",
First user profile (120),
generated token (130),
e.g. "xyz"

Token (130) = "xyz" sent to consumer app / client (400)

BOS_ID (110) first User_ID (110) BOS, First computer system (100)

User app / client (400) forwards token (130) to (200)

User (105, 205) (same user),
First user_ID (110),
Second user ID (210)
is now logged in via (400) on both
First computer system (100)
and
Second computer system (200)

Serialized Code (230, 710)

Product item (720)

Token (130) = "xyz" forwarded from consumer app / client (400) to (200) CES

CES_ID (210) second User_ID in Second computer system (200), CES

Second Computer System (200)
CES receives token (130) "xyz"
Serialization system (700)

Second User_ID (210)

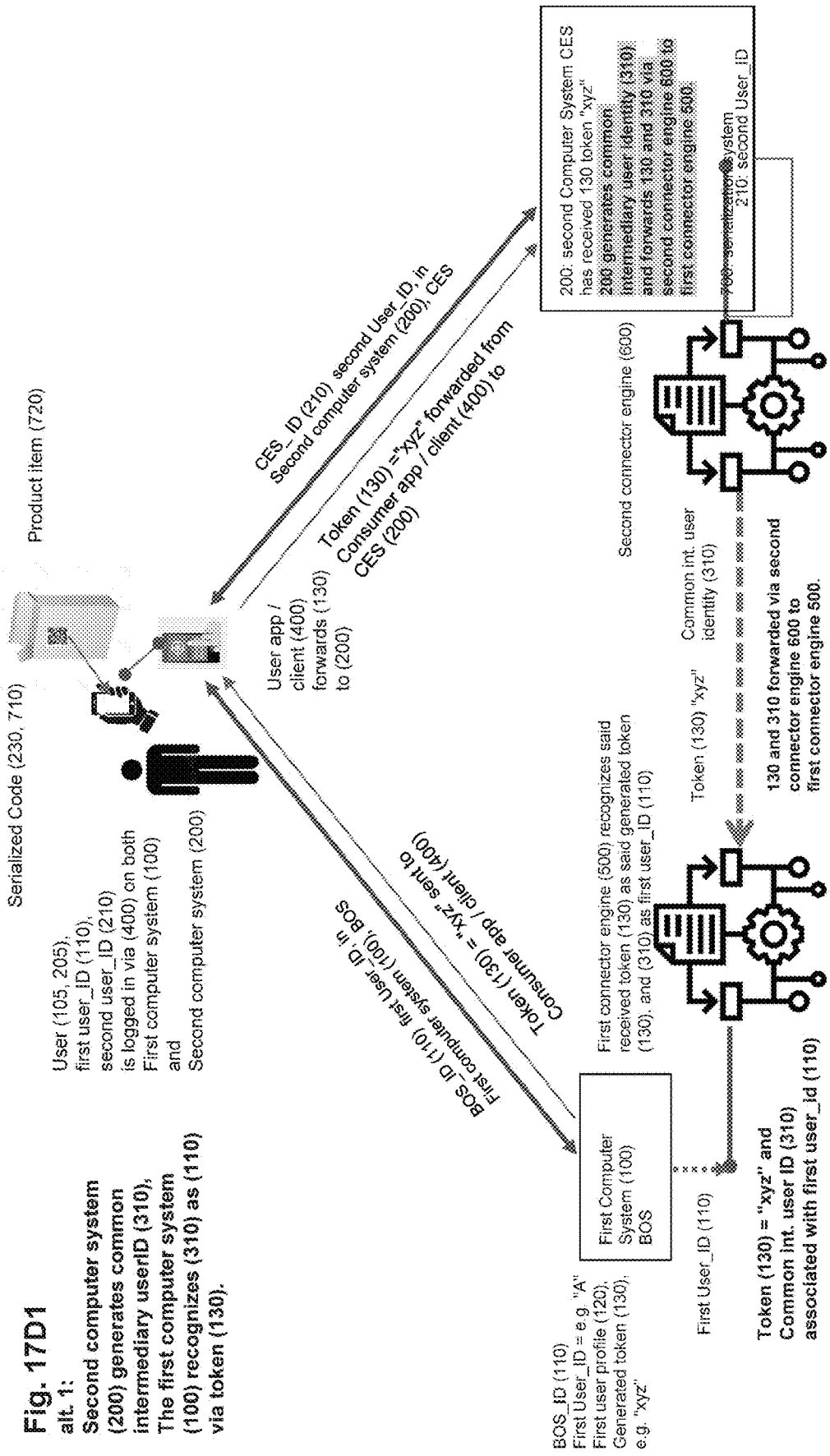

Fig. 17D2
alt. 2:
First computer system (100) generates common intermediary user_ID (310)

BOS_ID (110) =
first User_ID (110),
First user profile (120),
Generated token (130)
e.g. "xyz"

Token (130) = "xyz"
associated with
First user_ID (110), ==>
first computer system (100) generates
common intermediary user_ID (310)

User (105, 205),
first user_ID (110),
second user_ID (210)
is logged in via (400) on both
First computer system (100)
and
Second computer system (200)

Product item (720)

Serialized Code (230, 710)

First Computer System (100) BOS

First User_ID (110)

BOS_ID (110) first User_ID (110), BOS
Token (130) = (x{x), (100)
first computer system (100)
Consumer app / client (400) sent to First connector engine (500) recognizes said received token (130) as said generated token (130) and (310) as first user_ID (110)

Token (130) "xyz"
forwarded via second connector
engine (600) to
first connector engine (500)

Second connector engine (600)

User app / client (400) forwards (130) to (200)

Token (130) = "xyz" forwarded from Consumer app / client (400) to CES (200)

CES_ID (210) second User_ID, in Second computer system (200), CES

Second Computer System (200)
CES has received token (130) "xyz" and forwards (130) via second connector engine (600) to first connector engine (500).

Serialization system (700)

Second User_ID (210)

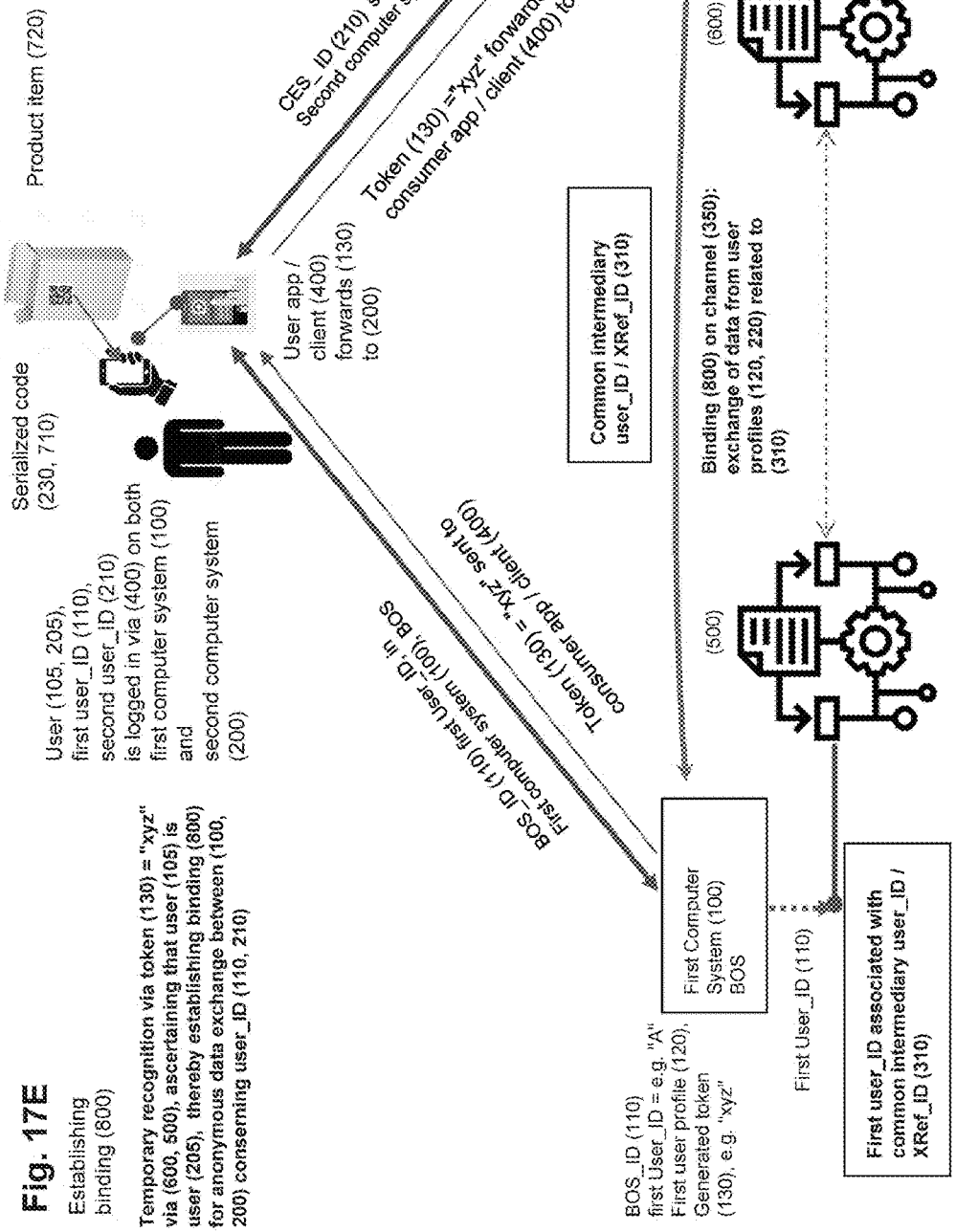

Fig. 18

| Second user_ID (210) CE_ID(int) | xRef | ! Key |
|---|---|---|
| 45576 | HT556 | 601 |
| 65545 | BX677 | 603 |
| 87765 | AD443 | 601 |
| 61112 | DF662 | 605 |

Resulting new Second User_ID (210)

Newly created First User_ID (110)

| First UserID (110) BOS_ID | xRef | ! Key |
|---|---|---|
| K6006T | HT556 | 601 |
| L3440R | BX677 | 603 |
| M7665F | AD443 | 601 |
| R0045R | DF662 | 605 |

METHOD AND SYSTEM FOR ENCODING AND DECODING USER IDENTITIES BETWEEN SYSTEMS

FIELD AND BACKGROUND OF THE INVENTION

Serialization of product items and traceability has become increasingly widespread in recent years. Uniquely identifiable product items are recognized and managed by computer-implemented traceability systems in the cloud. When a consumer or other user scans the code a response is returned to the user with information about that particular product item. As the demand for traceability and serialization has increased, an increasing number of traceability systems have been implemented and development of these systems has therefore accelerated.

Further, with the development efforts in this field follows an increasing number of functions and services in serialization and track and trace systems. And they are being designed and dedicated for communicating with a user/consumer that scans and interacts with a unique serialized item.

Essentially in many cases a serialized product and its unique code is associated with (or "owned by") a consumer that is managing the item. For the brand owner this is a new opportunity, a way of getting in contact with its customers/users that previously at least in practical terms was hardly possible.

BRIEF DESCRIPTION OF THE DRAWINGS

FIG. 3 roughly illustrates a situation, a problem that the current invention provides a solution for.

FIG. 9 illustrates the second computer system (200) CES needs information about a given second user ID (210) CES_ID, which is internal to the second computer system (200), wherein the second user ID (210)=45576.

FIG. 10 illustrates the first computer system (100) BOS uses the relevant encryption key: ! KeyID obtains the correct xRef. From table this key is 603.

FIGS. 11 and 12 illustrate an embodiment of the invention a one way function, where hashing, is being used, wherein the intermediate user ID (310) xRef is established by hashing with a salt value.

FIG. 17 illustrates that a user (105, 205) wishes to, or is requested to, establish a binding (800) between two systems (100, 200) where they have a profile so that data may be exchanged on a secure channel (350) between the two systems (100, 200) under a common intermediary user ID (310).

FIG. 17A illustrates an early step of the method of the invention, which comprises a computer implemented method for facilitating communication and information exchange about a common user (105, 205) between a first computer system (100) and at least one second computer system (200).

FIGS. 17B, 17C and 17D1 illustrate a subsequent step of the method of the invention.

FIG. 17D2 illustrates an alternative embodiment of the invention as an alternative to the embodiment illustrated in FIG. 17D1

FIG. 17E illustrates a subsequent step of the method of the invention

FIG. 18 illustrates one way by example, the first computer system (100) BOS used its own procedure to create a new first user id (110), in this case R0045R.

CONSUMER ENGAGEMENT ON BEHALF OF THE BRAND OWNER

We refer to such interaction between brand owner and customers/users and its system with the generic term consumer engagement system CE, or CES. It is understood that a consumer engagement system naturally comprises a number of underlying business systems that supports the overlying consumer engagement. In relation to this invention a general and generic consumer engagement system is a computer implemented system by which the consumer can interact.

A user profile in the CES is a tool that is needed for the consumer to properly communicate with the CES to take advantage of its benefits and services. Essentially a user profile makes it possible for the CE system to link data and system use to a given consumer identity. This is important as many of the functions and rewards in the CE system can only be performed in the context of an individual user. Not all functions necessarily needs to act in this way as it is fully possible to have functions that are completely independent in relation to the user. A simple example for a serialization system is code verification via an open webpage. A response is returned without any need for the system to link that to a given user.

However for most functions this is not the case, as the "cumulative" and repeated or prolonged use by an individual consumer/user needs a user profile to work as intended. At the same time the brand owner might, in addition also have their own separate and independent Customer Relations Management system (CRM) where the same consumer or individual has a user profile. The user profile residing and managed within a brand owner system has its own judicial and legal framework under which the data is processed. The CRM system is also a consumer engagement system. The datasets for the consumer within the brand owners CRM system (BOS) and the serialization consumer engagement system (CES) are usually unrelated to each other.

A brand owner thus might have a CRM-system (BOS) wherein consumers have a profile and a long standing relation to the brand. This relation and the consumers interaction might have a long history. The brand owner might implement a serialization and track and trace system that is designed to include active interaction by their consumers. Many services and benefits provided by the specialized serialization and track and trace systems are only for consumers.

Figure 4:
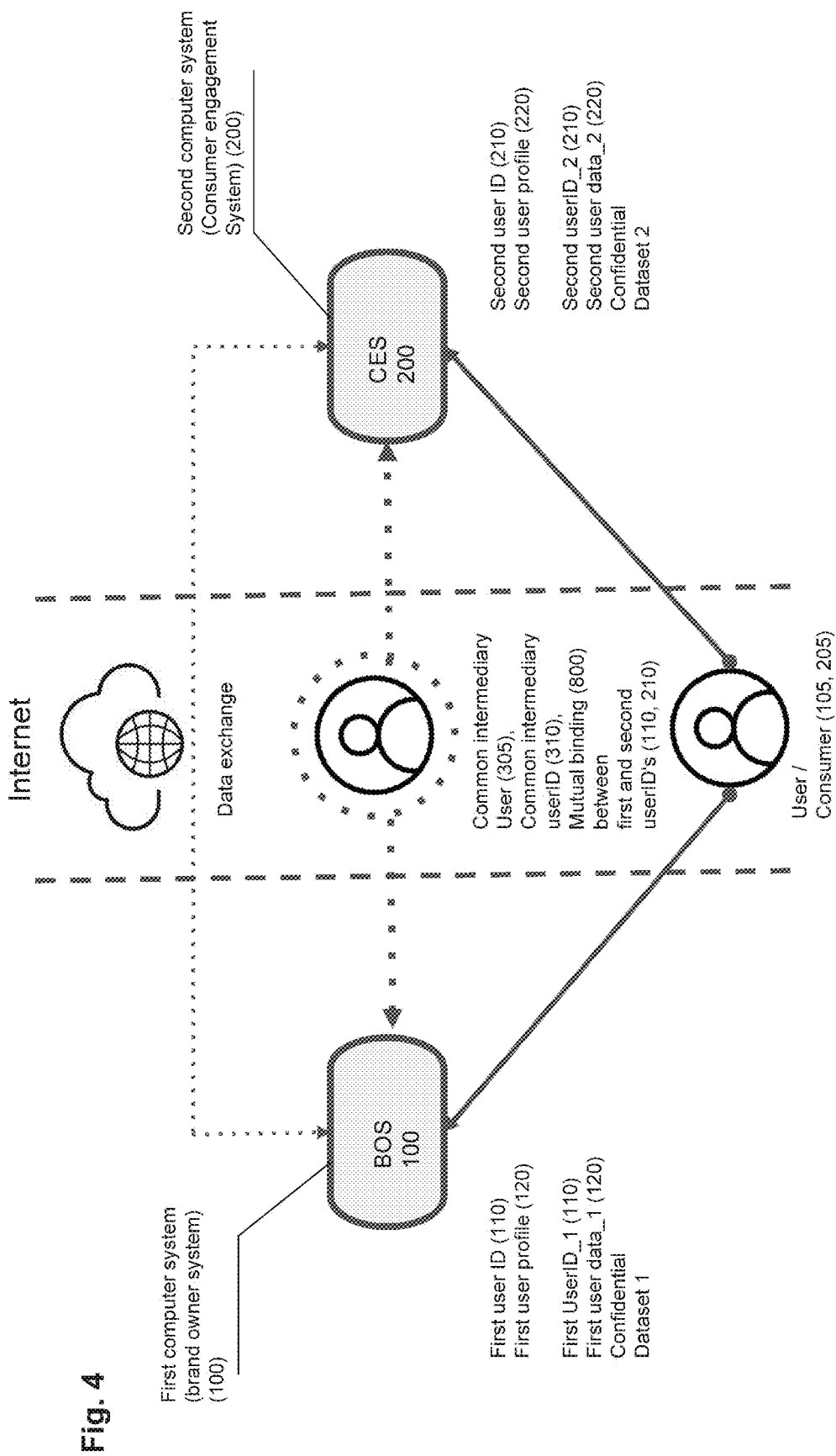
FIG. 4 sketches an improved situation wherein the same user's (105, 205) user profiles (120, 220) can be virtually exchanged between the systems (100, 200) and the consumer's user experience wherein the two systems (100, 200) are perceived and observed as one single and coherent system.

In many cases a serialization and track and trace system for a brand owner (manufacturer of goods) is made available in "the cloud". Furthermore, an expert vendor of such systems operates the system on behalf of the brand owner (the expert vendor's customer). These systems in "the cloud" commissioned by the brand owner have been developed and designed by the expert vendor and therefore have a very high degree of standardization and commonality, it is productified software to serve several customers for a certain market/industry need. It follows that the expert vendor handles massive amounts of data for both the brand owner as well as the consumers data. It is important to observe that even though both systems are under the principal control and management of the brand owner, it is common that in the consumer engagement system in relation to the serialization system—there is a "new", independent and separate user profile for the "same" consumer and individual that might be found, associated and/or reflected in the brand owners own CRM-system. FIG. 4 shows this situation where a user has a user profile both in the brand owners CRM-system, a first computer system (100), here denoted BOS and Dataset_1, and at the same time, related to the BOS, an additional user profile Dataset_2 in a serialization consumer engagement system, second computer system (200), here denoted CES (200), operated for the same brand owner.

The serialization system CES (200) may have its own specialized functions mostly directed at services and benefits that are realized by underlying data generated by serialization and track and trace. For instance a quick example of such is that if a consumer scans the codes of three product items during one and the same purchase, a discount will be offered by the system for the next purchase.

Similarly, the CRM system BOS (100) may have a lot of data generated by other types of functions and benefits for the consumer based on previous "non-serialized" interaction between the brand and consumer. For instance the user might have been interacting via a brand dedicated website for an extended period of time.

Both consumer engagement systems separately hold a lot of valuable historical consumer data. The capability to unite and combine the two data sets for a consumer would be beneficial. Merging and conjoining the two data sources can be coordinated in order to provide a "richer" and seamless experience for the user. It is obvious that some data in the two consumer engagement systems are shared or duplicated, and there is therefore now a growing need to coordinate and manage consumer user profiles across several systems to enhance the functions made available. A user profile in relation to the present invention is to be understood as comprising all data that is uniquely and unequivocally linked to an individual user and is native to the system functions and services provided by the computer system in question. For instance, statistics about how many codes the user has verified with the system is such user profile data. Another user related data can then be that user "John Doe" on a given date validated 15 codes. In other words what is also sometimes referred to as user behaviour is part of the user profile. This unification, federation and coordination of data is even the basis for constructing new functionality (and consequently create data) in both systems that is enabled using the capability to combine and manage both/all the amalgamated, combined or federated data sources. Without this capability the functions of both participating systems cannot be realized and operated.

A concern with brand owners is access to consumer data by other third parties. The current invention is a computer implemented solution for coordinating the consumer profile and the associated data, while at the same time maintaining mutual confidentiality, and preserving and enhancing functionality due to coordination of data related to the user identities. The data is coordinated across a plurality of otherwise independently participating systems.

EMBODIMENTS OF THE INVENTION

The current invention describes a computer implemented method for facilitating communication and information exchange between a first computer system and a second computer system; whereby a first unique user identity is in said first computer system, and a second unique user identity is in said second computer system shall be linked. The first user identity becomes related to said second user identity by a common intermediary encoded user identification, where said common intermediary encoded user identification can be resolved to the first user identity by the first computer system, and resolved to the second user identity by the second computer system. One may say that the first and second user identities become bound and entangled when connected via the common intermediary user identification. The first and second user identities may represent one and the same person, or one and the same legal person.

The invention provides a computer implemented method for facilitating communication and information exchange about a common user (105, 205) between a first computer system (100) and at least one second computer system (200), wherein said first computer system (100) is arranged to comprise at least one first user profile (120) for at least one unique and internal first user identity (110) for at least one first user (105)

said second computer system (200) is arranged to comprise at least one second user profile (220) for at least one second unique and internal user identity (210) at least one second user (205)

wherein at least one said first user (105) and at least one said second user (205) being said common user (105, 205);

the method comprising
  a) user (105) logs in via a user app (400) with the first user identity (110) having a first user profile (120) on said first computer system (100)
  b) user (205) logs in via user app (400) with the second user identity (210) having a second user profile (220) on said second computer system (200)
  c) said first computer system (100)
    generates a first token (130) and associates it with said first user identity (110) and provides said first token (130) to a first connector engine (500), and
    also sends said first token (130) to said user app (400), which further forwards said first token (130) to said second computer system (200), which associates said first token (130) with said second user identity (210), d) said second computer system (200) forwards said first token (130) and said second user identity (210) to a second connector engine (600) which communicates said first token (130), e) said second connector engine (600) generates an intermediate user identity (310) based on said second user identity (210), and sends said intermediate user identity (310) with said token (130) to said first connector engine (500), f) said first connector engine (500) compares said received token (130) with said transmitted token (130), g) if said received token (130) is recognized as said generated token (130) then said first computer system (100) recognizes said intermediary user identity (310) as said first user identity (110), h) said first computer system (100) and said second computer system (200) anonymously forming a binding (800) via said intermediary user identity (310) linking said first user identity (110) to said second user identity (210), i) said first and second computer systems (100, 200) sets up a secure channel (350) for mutual communication concerning information from said first and second user profiles (120, 220) via said intermediary user identity (310), In broader aspect, the invention provides a computer implemented method for facilitating communication and information exchange between a first computer system (100) and a second computer system (200),
wherein
said first computer system (100) is arranged to comprise one or more first user profiles (120) for corresponding one or more unique and internal first user identities (110) for corresponding one or more first users (105)

said second computer system (200) is arranged to comprise one or more second user profiles (220) for corresponding one or more second unique and internal user identities (210) for one or more said second users (205)

wherein at least one said first user (105) and at least one said second user (205) actually is the same user (105, 205);

the method comprising
providing a unique common intermediary user identity (310) whereby said first user identity (110) and said second user identity (210) are mutually bound (800) via said common intermediary user identification (310);

wherein said common intermediary user identification (310) is resolved/decoded to first said user identity (110) by said first computer system (100), and wherein said common intermediary user identification (310) is resolved/decoded to said second user identity (210) by said second computer system (200), whereby said information exchange, related to said first user profile (120) of said first user (105) or said second user profile (220) of said second user (205) between said first computer system (100) and said second computer system (200) is enabled using said common intermediary encoded user identity (310) and take place without exchanging said first and second user identities (110, 210).

In an embodiment of the invention, it is established communication from an app to both first and second computer systems. Said user (105, 205) conducts the steps of logging in and communicating via a user app (400) user under said first user identity (110) on said first computer system (100) and also logging in and communicating via said user app (400) under said second user identity (210) on said second computer system (200).

In an embodiment of the invention, it is established a common intermediary user identity (310) «Xref» for linking the first and second user identities (110, 210). Said first computer system (100) generates a token (130) that is linked with said first user identity (110), further transmitting said token (130) from said first computer system to said user app (400), said user app (400) forwards said token (130) to said second computer system (200), second computer system (200) linking said token (130) to said second user identity (210), said second computer system (200) generating said common intermediary user identity (310) based on said second user identity (210), said second computer system (200) transmitting said generated common intermediary user identity (310) and said token (130) to said first computer system (100), said first computer system (100) receiving said common intermediary user identity (310) and said token (130) thus linking said common intermediary user identity (310) to said first user identity (110), without mutually exchanging said first and second user identities (110, 120).

The first user identity (110) is now recognized via the common intermediary user identity (310) with the second user identity (210), each computer system now knows that they relate to the same first and second user identity (110, 210) without exchanging/mutually revealing the first and second user identities (110, 210).

In an embodiment of the invention, it comprises that said link between said second user identity (210) via said common intermediary user identity (310) to said first user identity (110) is named a mutual binding (800).

In an embodiment of the invention, a second connector engine (600) is arranged with said second computer system (200) for converting said second user identity (220) to said common intermediary user ID (310).

In an embodiment of the invention, a first connector engine (500) is arranged with said first computer system (100) for receiving said common intermediary user identity (310) and converting or associating it to said first user identity (110).

In an embodiment of the invention said first connector engine (500) is arranged with said first computer system (100) for receiving said first user identity (110) and converting said first user identity (110) to said common intermediary user identity (310).

In an embodiment of the invention, said second connector engine (600) is arranged with said second computer system (200) for receiving said common intermediary user identity (310) and converting said common intermediary user identity (310) to said second user identity (210).

In an embodiment of the invention it comprises, when said common intermediary user identity (310) is established, communicating part of said second user profile (220) except said second user identity (210) with said intermediary user identity (310) from said second computer system (200) via a secure channel (350) to said first computer system (100) and using said part of said second user profile (220) in said first user profile (120).

As an example, the second computer system (200) may send a unique serial code (230) of a product item registered in said second user profile (220) from said second computer system (200) to said first computer system (100) and adding that unique serial code (230) to said first user profile (120). This may add to said first user profile (120) that the user (105) has bought the product item having that unique serial code (230).

As an other example, it may send a unique serial code (230) of a product item registered in said first user profile (120) from said first computer system (100) and asking for further information related to said unique serial code (230) of said product item from said second user profile (220), such as a geolocation (240) where said unique serial code (230) was registered.

In an embodiment of the invention, said intermediary user identification (310) is encoded.

In an embodiment of the invention said intermediary user identification (310) is encrypted.

In an embodiment of the invention said first computer system (100) is a brand owner system BOS. In an embodiment of the invention said second computer system (200) comprises a track and trace system.

In an embodiment of the invention said user app (400) is used to read a serialized code (230) from a product item (720) and to communicate said serialized code (230) while logged in as said second user identity (210) to said second computer system (200).

The User, the userID and the User Profile

Figure 1:
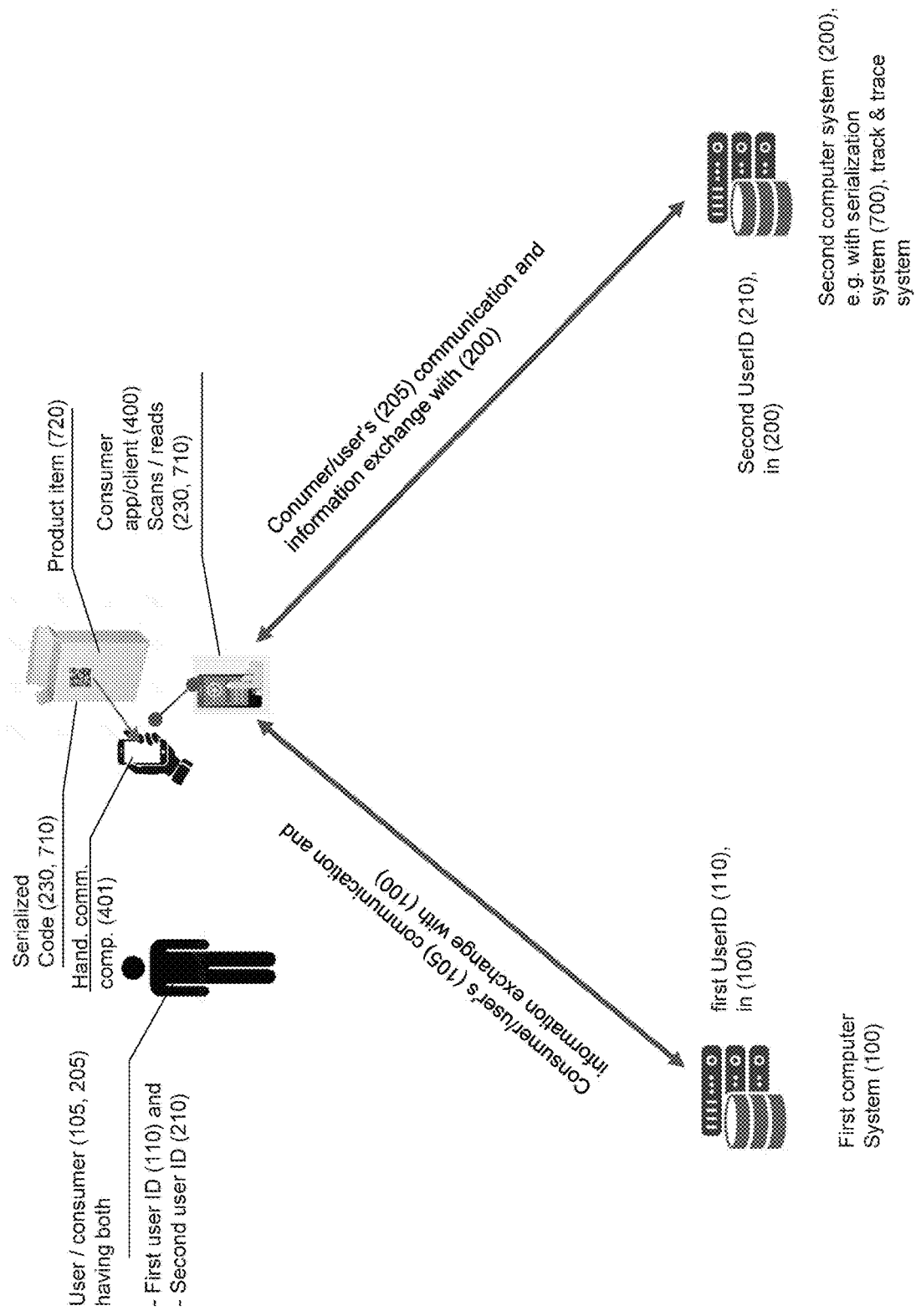
FIG. 1 shows a consumer/user (105, 205) with a handheld communicating computer (401) arranged for communication, such as a mobile with a mobile app (400).

In relation to the present invention a client (400) is a piece of hardware and/or computer software that is capable of processing computer instructions, and also able to communicate through computer (enabled) networks and thus connect and communicate with other clients (400), software and computers, please see FIG. 1.

As an example the client (400) may be a smartphone app (400) to interact with a user (105, 205) and communicate e.g. scanned serialized codes (230) from a product item (720) to a track and trace system (700) of a customer system (200) run on a server at a specialist vendor, and exchanges information based on the serialized code (230, 710). Interaction with the computer systems (100, 200) without the code (230, 710) may also occur if the user (105, 205, 305) just wishes to access the data available in the computer systems (100, 200).

A user (105, 205, 305) is in the present context an individual or person that interacts with such a client (400) to take advantage of the client's (400) capabilities to perform and operate tasks and functions available by the client (400). When a user (105, 205, 305) interacts with a client (400), that interaction is also sometimes referred to as the user experience.

A user profile (120, 220) is understood to be an authorization to interact with the client (400) and/or a computer system (100, 200) and a specific and unique user identity (210) identifiable information related to the user (105, 205) that will govern the interaction with the client/system (100, 200). Such user profile (120, 220) is very commonly comprising information such as:
  user name,
  address,
  user email,
  user mobile phone number,
  user id (110, 210) assigned within the client (400),
  selected user preferences within the client (400), etc.

A user profile (120, 220) is in practical terms required in being able to use the services provided by the computer system (100, 200). Further the user identities (110, 210) handled by this invention are "native" in the sense that they are original and single in relation to the user (105, 205) as opposed to what some Single-Sign On (SSO) systems deploy.

Consumer Engagement System

FIG. 1 shows a consumer/user (105, 205) with a handheld communicating computer (401) arranged for communication, such as a mobile with a mobile app (400). The mobile app (400) is used for the handheld computer (401) scanning a serialized code (230, 710) of a product item (720) and getting information about this product from the serialization system (700), which in this case also is comprised in a consumer engagement system (200) for the user (105, 205).

In an embodiment of the invention the serialized code (230, 710) is a unique code. Such unique codes are important for making track & trace of codes on product items (720) actually work.

Figure 2:
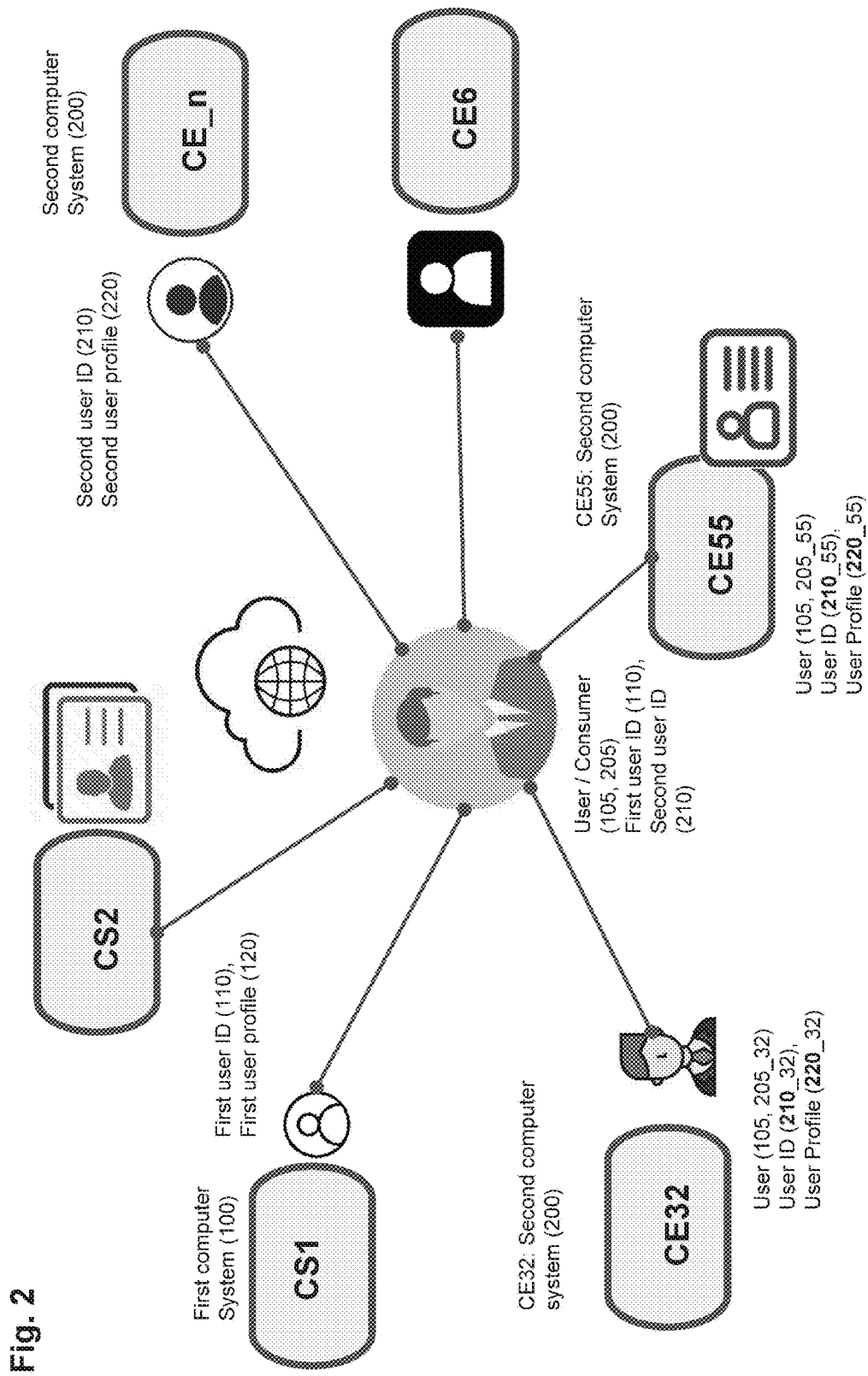
FIG. 2. illustrates the user (105, 205) in a context among several computer systems.

FIG. 2. illustrates the user (105, 205) in a context among several computer systems. Several consumer computer systems such as a first computer system (100) and a second computer system (200) are accessible in "the cloud", such as one or more banks, Netflix, Facebook, Instagram and so on. As depicted in FIG. 1 the individual user (105, 205, . . . ) has a user profile (120, 220, . . . ) with all the services/computer systems, he or she is using. An individual user profile (120) within one computer system (100) is different and separate from the same user's individual user profile (220) within another computer system (200, . . . ). Individual user profiles (120, 220) with each computer service (100, 200) are thus different and separate from the other user profiles (120, 220) that the individual user (105, 205) has, they normally contain different information and some common information related to the one and same user (105, 205). In principle, a system such as illustrated as (CE32) With a user profile (220_32) has no knowledge or access to a user profile (220_55) in another system, such as illustrated here as (CE55) by design. The various user profiles (120, 220, 220_32, 220_55 . . . ) might usually manage some identical data, but which are not shared data, about the individual user (105, 205, 205_32, 205_55, . . . ). Typical examples of the same/shared data presented in several user profiles (120, 220, 220_32, 220_55, . . . ) are the user's (105, 205) name, email address and cell phone number. Typical examples of not shared data are social security number which may be forbidden to share, passport number, account number, etc.

FIG. 2. shows a normal and very common situation for an individual. The person is a user (105, 205) of several consumer computer systems (100, 200, 200_32, 200_55, . . . ) accessible in the cloud, such as a first bank, a second bank, Netflix, Facebook, Instagram, and so on. Usually in the present jungle of consumer computer systems, a user/consumer (105, 205) might be using tens if not hundreds of consumer computer services or systems (100, 200) in the cloud. As depicted in FIG. 1 the individual has a separate user profile (105, 205, . . . ) with each of the computer systems/services (100, 200, . . . ) he or she is using. Although this particular individual user (105, 205) is the same natural or legal person in all cases and in all "user-system relations", every single of these individual user profiles (120, 220) with each computer service is, technically speaking, different and separate from the other user profiles (120, 220) that the individual user (105, 205) has in other computer systems (100, 200). As an example, computer system (200, CE32) has no specific knowledge or access to a user profile in another system (such as per example in the second computer system (200, CE55)) by design. The various user profiles might obviously manage some identical data (but not common/shared data) about the individual. Typical examples are name, email address, cell number and so on.

Figure 3:
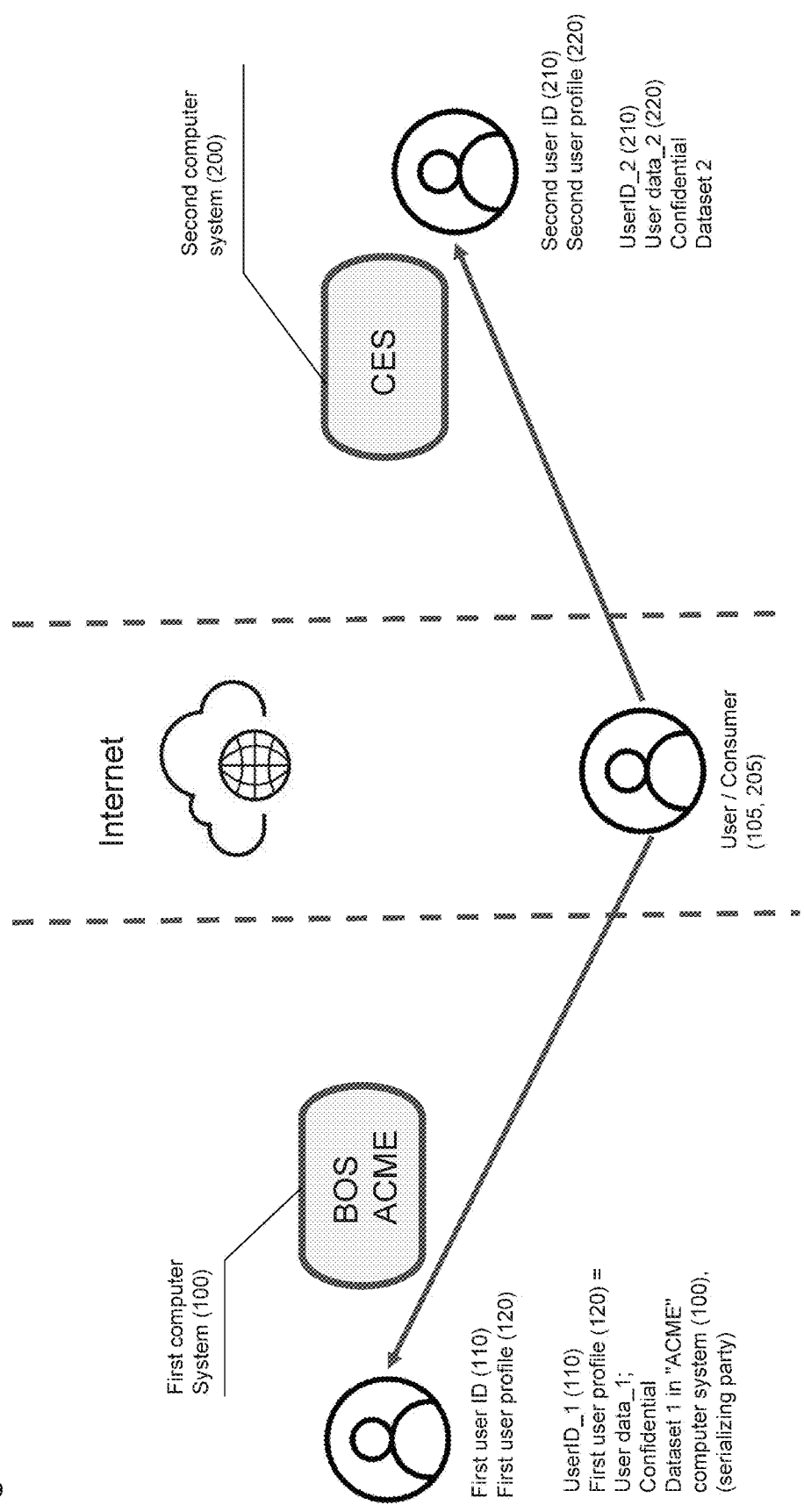

FIG. 3 roughly illustrates a situation, a problem that the current invention provides a solution for. A user (105, 205) has a user profile (120) with a brand owner (ACME) in a first computer system BOS (100). The user's (105) UsedID_1 (110) has first user profile (120) comprising user data with a confidential dataset 1 in "ACME"s computer system (100), which may be a serializing party.

At the same time this user (105, 205) has another user profile (220) in a second computer system (200), a consumer engagement system CES (200) where the user (205) is managing scanned serialized codes (230, 710) for product items (720) (see FIG. 1 and FIG. 17) that were serialized by the first computer system/BOS (100) system brand owner ACME. The second computer system CES (200) is usually operated by an expert vendor on behalf of ACME. It is clear that having in principle different and separate user profiles (120, 220) in this situation is inefficient, cumbersome and in some situations possibly confusing for the consumer (105, 205). The two computer systems are unable or not allowed to exchange the first and second userID's (110, 210) nor essential parts of the user profiles (120, 220).

FIG. 4 sketches an improved situation wherein the same user's (105, 205) user profiles (120, 220) can be virtually exchanged between the systems (100, 200) and the consumer's user experience wherein the two systems (100, 200) are perceived and observed as one single and coherent system. The present invention approaches such an improved situation. New functions for users can be designed and implemented due to the ability to now exchange data between the ensemble system that is linked to one and the same user. The systems (100, 200) manage data from one user profile (120, 220) that the other system mutually does not have and vice versa. However, by exchanging and managing data from user profiles (120, 220) between the two systems a better service can be provided to the consumer. A virtual common intermediary user (305) is established and has a common intermediary userID (310). This establishes a mutual binding (800) between the first and second userID's (110, 210) without allowing mutual access to the opposite computer system's (100, 200) user ID's (110, 210) nor their user profiles (120, 220).

When a user (205) scans a serialized code (230, 710) the interaction is with the consumer engagement system CES (200). To operate efficiently the CES (200) has a user profile (220) with relevant data in order to be able to handle the interaction properly. However, the user (105, 205) also has a relation with the brand owner system BOS (100). However, the user profile (220) that is retained inside the second computer system CES (200) is limited to operation within the second computer system CES (200).

Preservation of Confidentiality Between User ID Systems

An important technical aspect solved and provided by the current invention is that the primordial and elemental user identity (110, 210) is not exchanged between the computer systems (100, 200) during the coordinated communication between the computer systems (100, 200). Elemental user identity (110, 210) within a computer system (100, 200) is hereby to be understood as the information that that computer system (100, 200) and their databases uses to identify and process the user's (105, 205) interaction. In databases (100, 200) in most cases these userID's (110, 210) constitutes a primary key in the respective database. To further illustrate this by way of example; imagine that in the BOS system (100), the BOS_ID (110) is a social security number for the individual (105). In Norway, for instance, this social security number is a very prolific user ID "primary key" which should not be distributed uncontrolledly. Another approach, for a CES system (200), might just be a sequential user id (210) number or a unique text string such as say "3GH45LLTR223NNGD". However, whatever the format and construction of such an user ID (110, 210) that a system employs, it is crucial that this ID (110, 210) resides only within the system (100, 200) itself where it originated and will not be exchanged with the other system.

An advantage of the present invention may be illustrated by the following: The social security number, the "person number" for a person in Norway comprises the birth date DDMMYY and a serial number NNNNN and is used for identifying a person before national authorities such as the Public Health Services, Police, Tax authorities, Social security, Banks, etc. This social security number shall not be exchanged to other nations authorities. Similarly, the same person may have a corresponding identification number before Swedish authorities, say the Swedish tax authorities, and that authority is not allowed to exchange the person's Swedish identification number with the Norwegian social security number. Thousands of persons living near the border and working part time in either country experience problems related to the two countries' tax authorities inferior coordination of a person's tax calculation because information related to one and the same person cannot readily be exchanged based on neither the Swedish nor the Norwegian social security number. The present invention would enable the Norwegian and the Swedish authorities to safely and confidentially exchange and manage data relating to the same person across the two systems without ever exchanging user profile data which should not be revealed to the opposite system.

Figure 5:
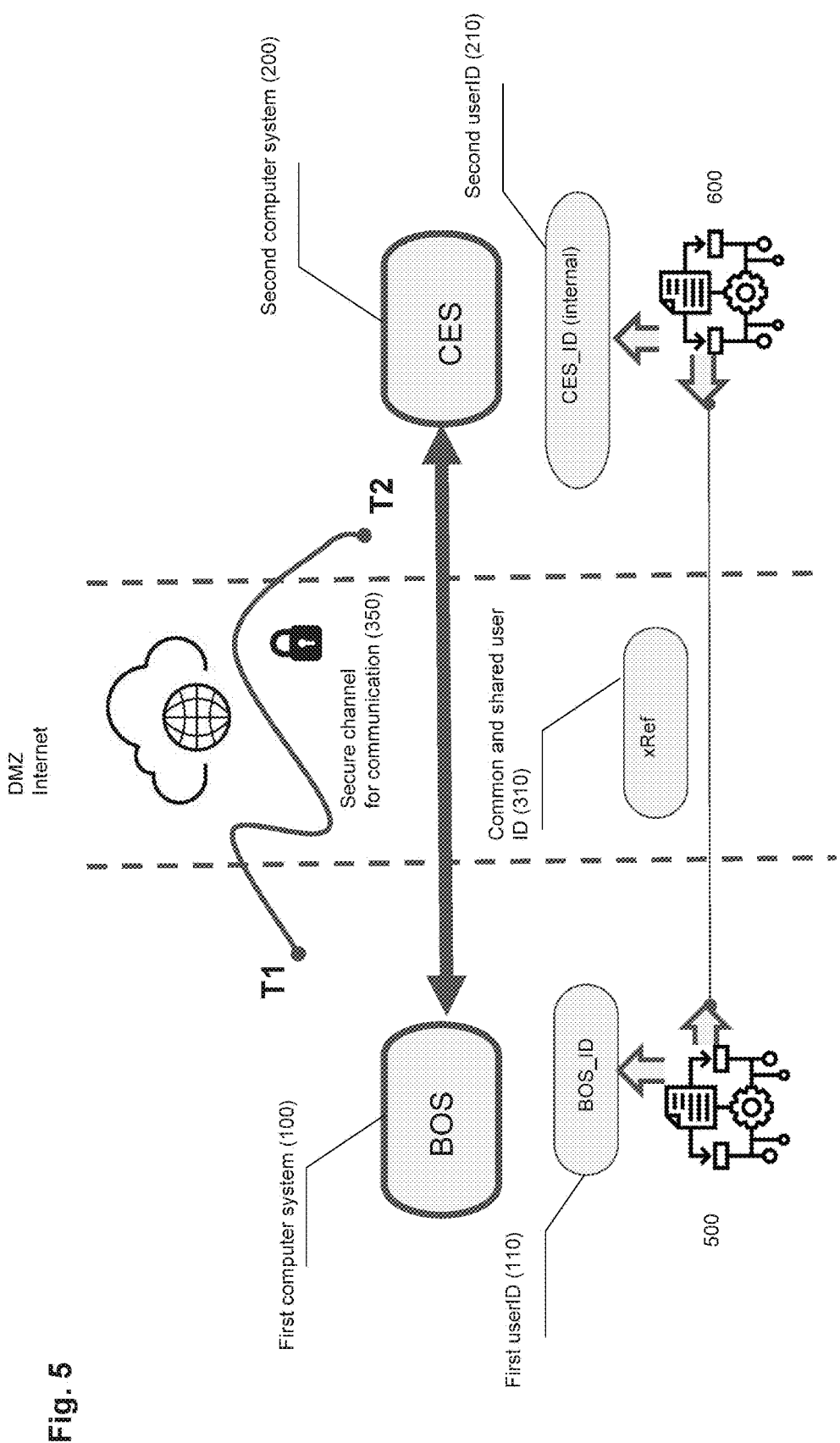
FIG. 5 illustrates the principle of how the present invention works. The first computer system (100) "BOS", is coordinating and communicating with the second computer system (200) "CES" using their respective User ID (110, 210) via connector engines (500, 600), respectively, concerning a user (105, 205).

FIG. 5 illustrates the principle of how the present invention works. The first computer system (100) "BOS", is coordinating and communicating with the second computer system (200) "CES" using their respective User ID (110, 210) via connector engines (500, 600), respectively, concerning a user (105, 205). The first computer system "BOS" (100) is, on its side, internally using BOS_ID, (110) and likewise the second computer system "CES" (200) is using CES_ID (210) for the same individual, the user/consumer (105, 205), within its system, CES (200). As can be seen neither internal user identities (110, 210) are exchanged all the way from the first computer system (100) to the second computer system (200), as they both are converted into a common intermediary shared user ID (310) that is a cross reference ID "xRef_ID" (310), an encoded user identity.

Secure Channel for Communication

In FIG. 5 and FIGS. 6, 7, 8, 13 and 14, there are illustrated two endpoints T1 and T2. These endpoints (T1, T2) serve as the interfaces between which the first and second computer systems (100, 200) communicates, where either this being the first point of contact for receiving data from the other system, or the last point before sending data to the other computer system (100, 200). An unsecure network such as the internet/DMZ is at disposal between the two systems, the first and second computer systems (100, 200) over which they can communicate. For the present invention and for the sake of simplicity it is assumed that a secure channel (350) is available between the two systems represented by T1 and T2. Setting up this secure communication channel/tunnel (350) is vital for the practical use of invention. Between the endpoints (T1) and (T2) the channel (350) must facilitate confidentiality and authentication of the other, opposite computer system (100, 200) before starting communication and using the current invention.

How this secure channel (350) is implemented in practical terms will however not to be further discussed here, since this is assumed to be something that someone skilled in the art can arrange and facilitate, and there are a wide array of technologies, solutions and standards that enables such a secure tunnel.

The encryption scheme discussed later in this description (unless otherwise mentioned) is therefore not a part of setting up and/or operating the secure channel (350) between the communication channel endpoints (T1) and (T2).

Establishing the Binding of the User Profiles

In this description it is disclosed how to communicate between a first and a second computer system (100, 200) that have a mutual binding (800) and thus a combined utilisation of mutually non-exchanged information between the two user profiles (110, 210) related to a given single user (105, 205) related to both computer systems (100, 200). In many cases the user (105, 205) is already represented in both systems (100, 200). So there needs to be a system and a procedure to establish the link of the user profiles (120, 220) and make the binding (800). In case the single user (105, 205) is not established with a user identity (110, 210) in one or either of the systems, the user identity (110, 210) should be established with a corresponding user profile (120, 220) before continuing with the present invention.

FIG. 17 illustrates that a user (105, 205) wishes to, or is requested to, establish a binding (800) between two systems (100, 200) where they have a profile so that data may be exchanged on a secure channel (350) (not shown in FIG. 17, please see FIG. 14) between the two systems (100, 200) under a common intermediary user ID (310). Further the user experience is facilitated and streamlined between the two systems (100, 200). The first computer system (100) generates a token (130) that is linked unambiguously with the user's (105), userID's (110) user profile (120) in that system (100). The token (130) is now transmitted to the user's (105) client/app (400) based on the user profile (120) in the first computer system (100), which is also in communication with the second computer system (200) acting as second user (205). The user's (205) on client (400) connects with the second system (200) with that user's (205) user profile (220) in the second computer system (200), and forwards the token (130) to the second system (200). The second system (200) transmits the token (130) back to the first system (100) via second and first connector engine (600, 500) components described below, so that the binding (800) of the two profiles (120, 220) can be amalgamated. The second computer system (200) recognizes the second user ID (210) via the second connector engine (600) as the common intermediary user ID (310), the first computer system (100) recognizes the common intermediary user ID (310) as the first user ID (110) via the token (130).

The client/app (400) to make this connection must be programmed to facilitate the process, as well as that the systems have API's and functions that enable the binding (800) process as described. The verification and proof signing of both the token and user/app as it is exchanged by the various systems and process steps might be implemented.

FIG. 17A illustrates an early step of the method of the invention, which comprises a computer implemented method for facilitating communication and information exchange about a common user (105, 205) between a first computer system (100) and at least one second computer system (200), wherein said first computer system (100) is arranged to comprise at least one first user profile (120) for at least one unique and internal first user identity (110) for at least one first user (105) said second computer system (200) is arranged to comprise at least one second user profile (220) for at least one unique and internal user identity (210) at least one second user (205), wherein at least one said first user (105) and at least one said second user (205) being said common user (105, 205. The method comprises the step that the user (105) logs in via a user app (400) with the first user identity (110) having a first user profile (120) on said first computer system (100).

FIG. 17B illustrates a subsequent step of the method of the invention, wherein the user (205), which is actually the same user as user (105), logs in via the user app (400) with the second user identity (210) having a second user profile (220) on said second computer system (200). The user profile (220) will usually contain other data than the first user profile (120).

FIG. 17C illustrates a subsequent step of the method of the invention, wherein said first computer system (100) generates a first token (130) and associates it with said first user identity (110) and provides said first token (130) to a first connector engine (500), and also sends said first token (130) to said user app (400), which further forwards said first token (130) to said second computer system (200), which associates said first token (130) with said second user identity (210). The purpose of this token (130) is to enable both said first computer system (100) and said second computer system (200) to know that they are trying to connect one and the same user (105, 205) with userid (110, 210).

FIG. 17D1 illustrates a subsequent step of the method of the invention, the step wherein said second computer system (200) forwards said first token (130) and said second user identity (210) to a second connector engine (600) which communicates said first token (130).

Further said second connector engine (600) generates an intermediate user identity (310) based on said second user identity (210), and sends said intermediate user identity (310) with said token (130) to said first connector engine (500) belonging to the first computer system (100) which initially generated the token (130). Said first connector engine (500) compares said received token (130) with said transmitted token (130) and if said received token (130) is recognized as said generated token (130) then said first computer system (100) recognizes said intermediary user identity (310) as said first user identity (110).

FIG. 17D2 illustrates an alternative embodiment of the invention as an alternative to the embodiment illustrated in FIG. 17D1. In this embodiment the second connector engine (600) forwards said token (130) to said first connector engine (500) which compares the received token (130) with the originally transmitted token (130), and, if affirmative, said first connector engine (500) generates a common intermediary user identity (310) based on said first user identity (110). This is less straightforward than the direct method of FIG. 17D1.

FIG. 17E illustrates a subsequent step of the method of the invention, wherein said first computer system (100) and said second computer system (200) anonymously form a binding (800) via said intermediary user identity (310) linking said first user identity (110) to said second user identity (210). Further said first and second computer systems (100, 200) set up a secure channel (350) for mutual exchange of selected data from said first and second user profiles (120, 220) via said intermediary user identity (310).

With the secure channel (350) now set up for exchanging selected data, which are allowable to be exchanged between the first and second user profiles (120, 220) the first and second computer systems (100, 200) may cooperate by exchanging allowable parameters without mutually compromising non-allowable parameters such as the first and second user identities (110, 210). The first and second user identities may be a Norwegian social security number (110) and a Swedish social security number (210), further with the authenticating being preformed one is sure that the user (105, 205) are one and the same person.

User ID Connector Engine

Figure 15:
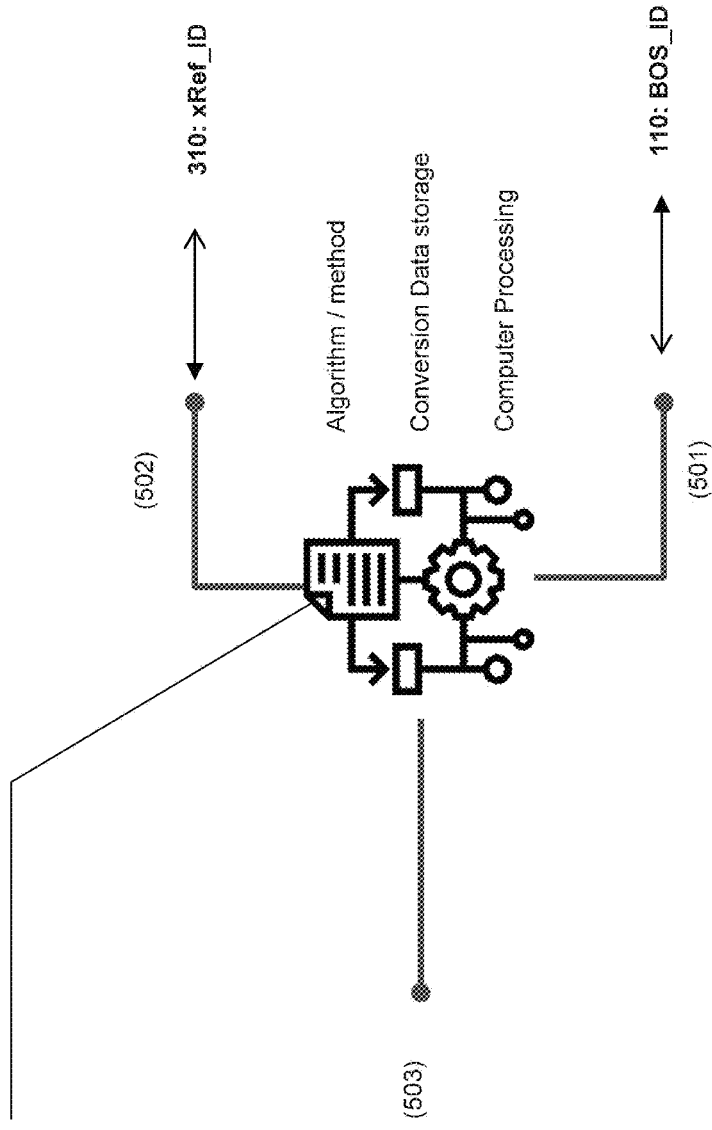
FIG. 15 illustrates symbolically of a useful component employed in the invention, the first User ID connector engine (500).

FIG. 15 illustrates symbolically of a useful component employed in the invention, the first User ID connector engine (500). The first User ID connector engine (500) is a coherent subsystem (software and possibly autonomous hardware implementation). The task and function of the first User ID connector engine (500) is to convert from an incoming intermediate user identity (310), a cross reference xRef (310) to an internal first userID (110) here named BOS_ID (110) in the first computer system (100), and/or converting a first userID BOS_ID (110) to a common intermediary user identity (310), xRefID (310). This subsystem, first connector engine (500), stores the information that is required to perform this task such as encryption keys (if used), databases and software that can process the relevant algorithm(s) and computer tasks necessary. This first connector engine (500) module has interface (502) where a request input intermediate user identity (310) is received by the User ID connector (500) and interface (501) where the resulting first user identity (110) is made available to the first computer system BOS (100), and vice versa. Interface (503) is a service interface used to maintain and operate the connector engine (500) module, typically to add new data to the module. In an embodiment of the invention the token (130) is recognized to verify or identify the correct intermediary user ID (310) as the first userID (110).

Figure 16:
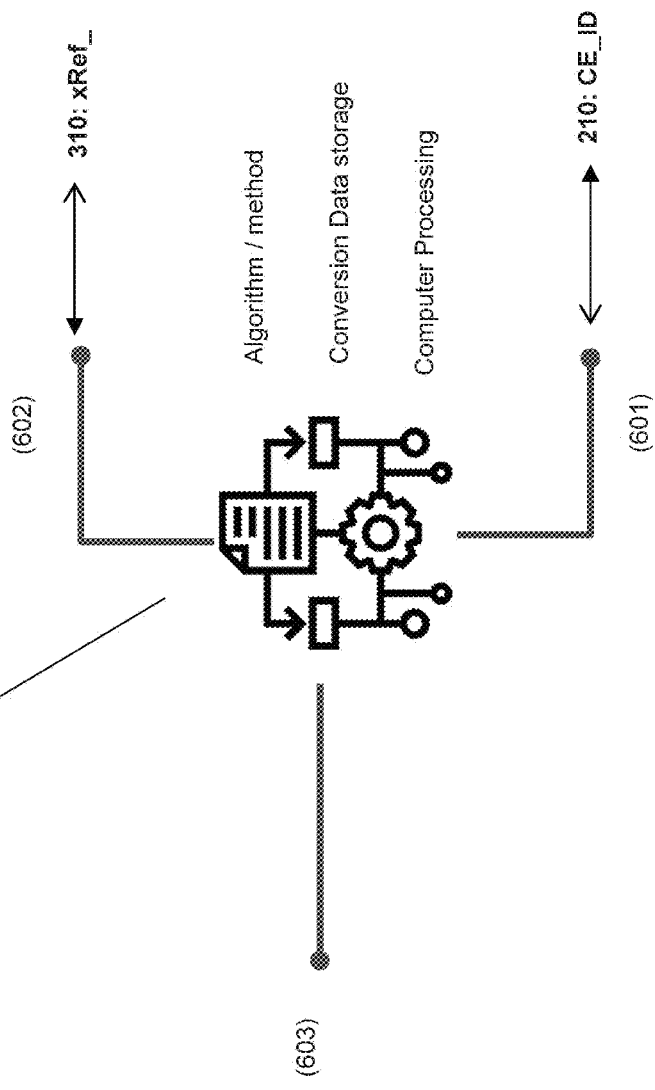
FIG. 16 illustrates symbolically a useful component used in the invention, the User ID connector engine (600).

FIG. 16 illustrates symbolically a useful component used in the invention, the User ID connector engine (600). The User ID connector engine (600) is a coherent subsystem (software and possibly autonomous hardware implementation). The task and function is to convert from an incoming intermediate user identity xRef (310) to the internal second user ID CE_ID(int) (210), and/or converting a second user identity CE_ID(int) (210) to an intermediate user identity xRef (310). This second user ID connector engine (600) subsystem stores the information that is required to perform this task such as encryption keys (if used), databases and software that can process the relevant algorithm(s) and computer tasks necessary. This module has interfaces (602) where a request input intermediate user identity xRef (310) is received by the User ID connector (600) and interface (601) where the resulting second user identity CE_ID (210) is made available to the second computer system CE (200). Interface (603) is an interface used to maintain and operate the second user connector engine (600) module, typically for instance to add new data to the user ID connector (600) module. In an embodiment of the invention the token (130) is recognized to identify or verify the correct intermediary user ID (310) as the second userID (110).

The first and second User ID connector engines (500) and (600) have the same basic task and construction, however they are necessarily not identical.

Managing Computer System when the User is Using a System Client

The present invention facilitates a "seamless" user experience for an individual user (105, 205) that has user profiles (110, 210) in two independent computer systems (100, 200) since each computer system (100, 200) can communicate with the user (105, 205) based on the corresponding user identity (110, 210) they have for the user/individual (105, 205). There are a number of aspects that still must be addressed for such use, for instance it is likely that the user (105, 205) in many cases must approve such use, such as background interaction between computer systems (100, 200). Further one can foresee that a developer of user apps/clients (400) must build in some type of controller systems that govern the behavior of such client (400) when they are communicating with "both" computer systems (100, 200) simultaneously, such as "combined" generated new data. Further within both computer systems (100, 200) also the system design must be carried out purposely in order to coordinate the functions and behavior between the two computer systems (100, 200) themselves. One such important coordination task is synchronization of the new generated "usage" data from all components for the overall combined system.

Such a controller system (software) may become complex. The current invention is however not directed at teaching how to construct and design such controller systems.

Binding and Entanglement of User Identities

FIG. 17 illustrates a principle for binding and entanglement between the native user identities (110, 210) between the two computer systems (100, 200) unequivocally. The first user ID (110) is linked via an application interface to the first connector engine (500). When the first computer system (100), triggers any processing request aimed at the second computer system (200), that involves the first user ID (110), it sends the first user ID (110) to the first connector engine (500) that will process the entanglement and binding (800) based on the first user identity (110) in question, where its appropriate second user identity (210) is resolved and matched using the corresponding second connector engine (600) residing in the second computer system (200).

FIG. 15 and FIG. 16 illustrate the components and functions of the first and second connector engines (500, 600). It works on a basis where an algorithm encodes and decodes a userID (110, 210) in the connector engines (500, 600), respectively, where basically the internal system userIDs (110, 210) are private and not mutually shared with any other computer system, the result of the algorithm yields and generates a temporary, mutually "shared" common intermediary userID (310).

Using a First User ID, Second User ID (110, 210) "Private UserID"; Algorithm: {Private UserID (110, 210)}→Shared UserID (310)=xRef, and Vice Versa; Using a Shared UserID, Common Intermediary UserID (310)=xRef; Algorithm {Shared UserID (310)}→Private UserID (110, 210).

In an embodiment of the invention an algorithm that enables and establishes a binding (800) is based on an encryption cipher and is described below. However, the algorithm can be any method, function or manipulation where the conversion and binding works both ways, e.i. it can encode and decode any UserID (110, 210) to a common intermediary user identity (310) "Shared UserID" and reverse a common intermediary user identity (310) "Shared UserID" to a Private UserID (110, 210).

The algorithm can use a hashing scheme, with or without salt, or simply tables that associates the Private UserID (110, 210) with the Shared UserID (310). In the latter case a random generated value for the common intermediary ID (310) Shared UserID will work.

The algorithm therefore might employ other ways and methods to establish the binding entanglement.

Encryption Embodiment of the Invention

The invention is in an embodiment using an encryption scheme to convert between the respective computer systems. For a better understanding of the encryption steps involved and the detailed process, we have devised some simple conventions and a formal way describing the steps, as follows;
- message; is any string or cleartext that can be encrypted with an encryption key using an encryption algorithm.
- ! keyID=key keyID; is an encryption key associated with a unique keyID so that the encryption key can be stored and retrieved and later used for the relevant encryption steps.
- encrypt is an encryption step where a message is encrypted with (! keyID) written as:
- encrypt {message< >! keyID}, where symbol < > stands for "with" or "using"

The encryption step result is then written as:
[message ! keyID] where # is indicating an encrypted string.

The complete encryption process might therefore be written as;
encrypt {message< >! keyID}→#[message< >! keyID]
where→reads "which gives" or "giving the following encrypted result".

To decrypt a message follows the same convention as the encryption and is thus written as:
decrypt {message< >! keyID}→& [message< >! keyID]; where the system & indicates "decrypted".

Using the same keyId when decrypting as used when encrypting, the following result can be observed:
decrypt {message< >! keyID}→& [message< >! keyID] inserting the values
decrypt {#[message ! keyID]< >! keyID}→& [#[message ! keyID]< >! keyID]
decrypt {#[message ! keyID]< >! keyID}→& #message→message Processing a Request In relation to the invention there are no limitations or specifications concerning the information exchange between the systems. The invention simply enables any computer implemented processing on both sides to be performed wherein the user identity (110, 210) needs to be exchanged and also according to the invention in such a way that the user identities (110, 210) are not shared or exchanged between the two computer systems (100, 200) at any time.

Sending a Request from the CES to the BOS

Figure 6:
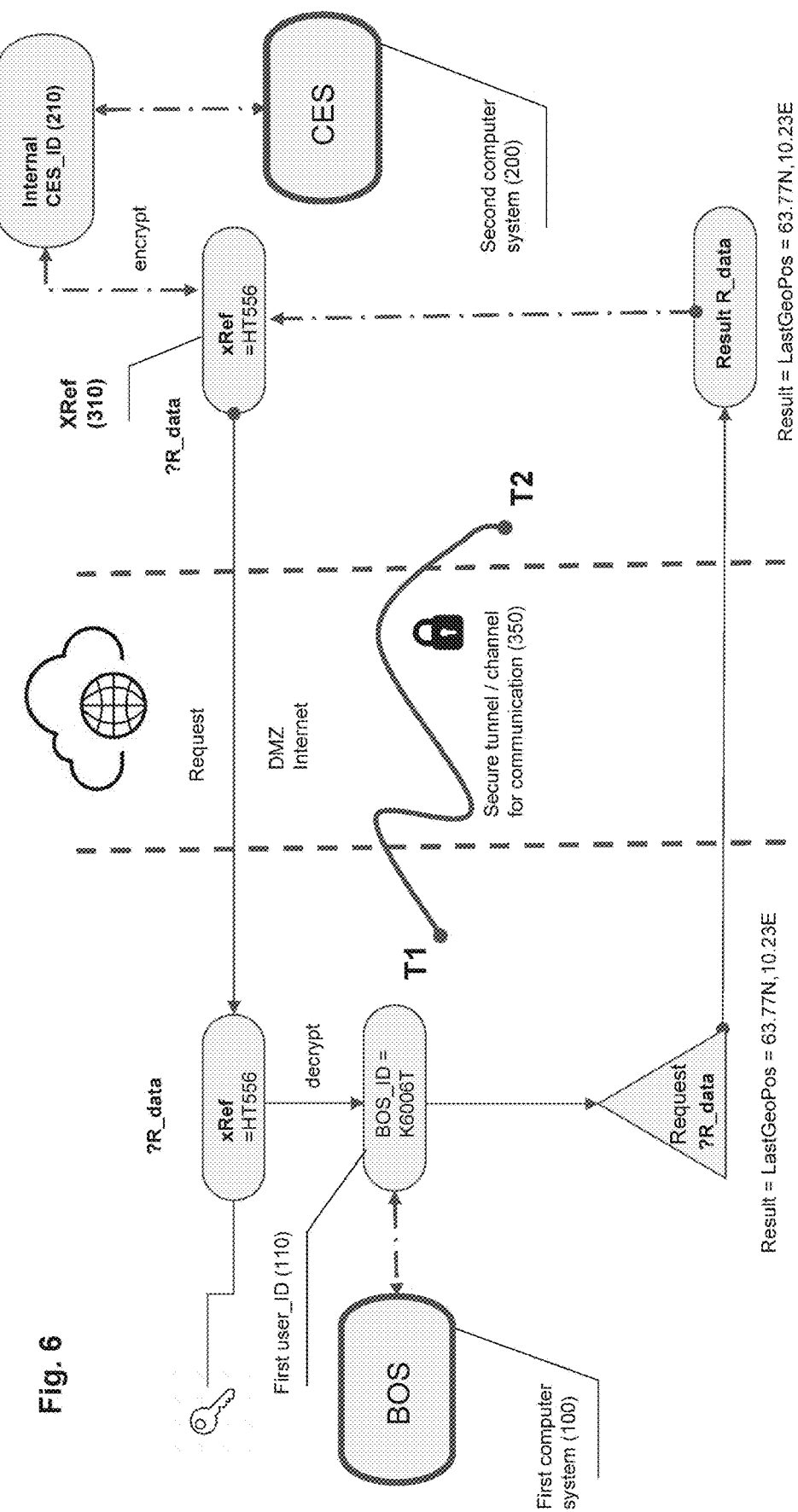
FIG. 6 illustrates the steps and process wherein the second computer system (200) CES requests information from the first computer system (100) BOS concerning the second user ID (210) CES_ID (internal reference).

FIG. 6 illustrates the steps and process wherein the second computer system (200) CES requests information from the first computer system (100) BOS concerning the second user ID (210) CES_ID (internal reference). Here this request for information about the user is denoted generically as "?R_data". The request "?R_data" can be about any information and of any format that both systems are capable of handling.

In the following steps we will use an example illustrated in FIG. 11 to better understand the invention.

Step 1V

The second computer system (200) CES needs information about a given second user ID (210) CES_ID, which is internal to the second compter system (200), please see FIG. 6. In this case the second user ID (210)=45576, please see FIG. 9. In the common Intermediate user ID (310), a cross reference xRef (310) conversion table the corresponding common intermediate user ID (310) xRef value is looked up and retrieved from this table. The second user ID (210) CES_ID gives that common intermediate user ID (310) xRef=HT556. The request ?R_Data from the second computer system (200) wants the last geolocation for the second user (205) for his last interaction with the first computer system (100) BOS. For the example we assume that this information is in fact available with the first computer system (100) BOS. The request ?R_data=lastGeoRef, the latest geolocation, e.g. geographical position, of the second user (205), which is also the first user (105) when logged on.

Please refer to the table FIG. 9:
Note that:
xRef=encrypt {message< >! keyID}→#[message< >! keyID],
where using the example values given provides the common intermediate ID (310), xRef:
xRef=encrypt {45576< >! 601}→#[45576< >! 601]=HT556
xRef=HT556

Step 2V

The second computer system (200) CES transmits this common intermediate user ID (310) named xRef=HT556 to the first computer system (100) BOS via the second terminal (T2) over the secure tunnel (350) along with the request ?R_data, to the first terminal (T1) at the first computer system (100), where the common intermediate userID (310) and the request ?R_data are received by the first computer system (100) BOS. Please see FIG. 6.

Step 3V

The first computer system (100) BOS now uses the procedure to distill the internal first user ID (110) BOS_ID using the received common intermediary userID (310), xRef:
decrypt {#[message ! keyID]< >! keyID}→& [#message ! keyID< >! keyID], which gives the following result;
decrypt {#[HT556! 601]< >! 601}→& [#HT556 ! 601< >! 601]→K6006T The common intermediary userID (310), xRef value HT556 is now determined to mirror and correspond to BOS_ID value K6006T, please see the left side of FIG. 6.

Step 4V

Using the BOS_ID that equals K6006T and the particulars of the request the BOS now processes the request ?R_data. For the example this is retrieved and the result is LastGeoPos=63.77N, 10.23E.

Step 5V

The R_data=LastGeoPos=63.77N, 10.23E is transmitted to CE via the secure channel (350) where CE is receiving the last geo position for user with xRef=HT556.

Step 6V

The circle is now "closed" and the second computer system (200) CES can process what it needs based on the information that it received from the first computer system (100) BOS. The second user ID CE_ID(int)=45576 and therefore the second computer system (200) CE now updates that in its core that 45576 was latest located at the position 63.77N and 10.23E the latest time the user (205) was interacting with the first computer system BOS (100).

Sending a Request from the BOS to the CES.

The first computer system (100) BOS needs to update the second computer system (200) CES with the latest geoposition that a given user (105) had the latest time this user (105) was in contact with the first computer system (100) BOS, and it also wishes to know which unique serial code (230) that triggered the data that is being known by the second computer system (200) CES.

Figure 7:
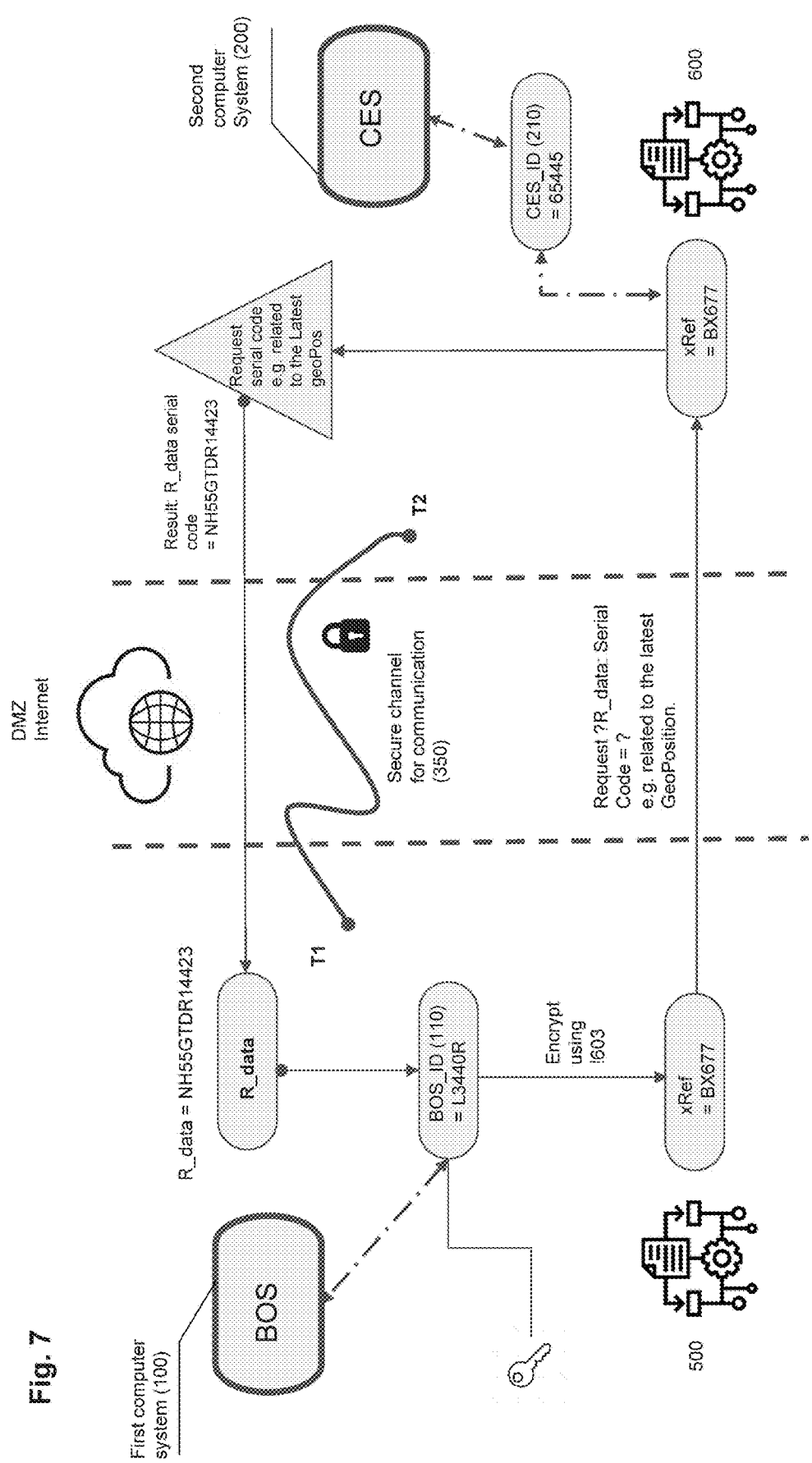
FIG. 7 illustrates the process and flow of sending a request from the BOS to the CES.
Figure 8:
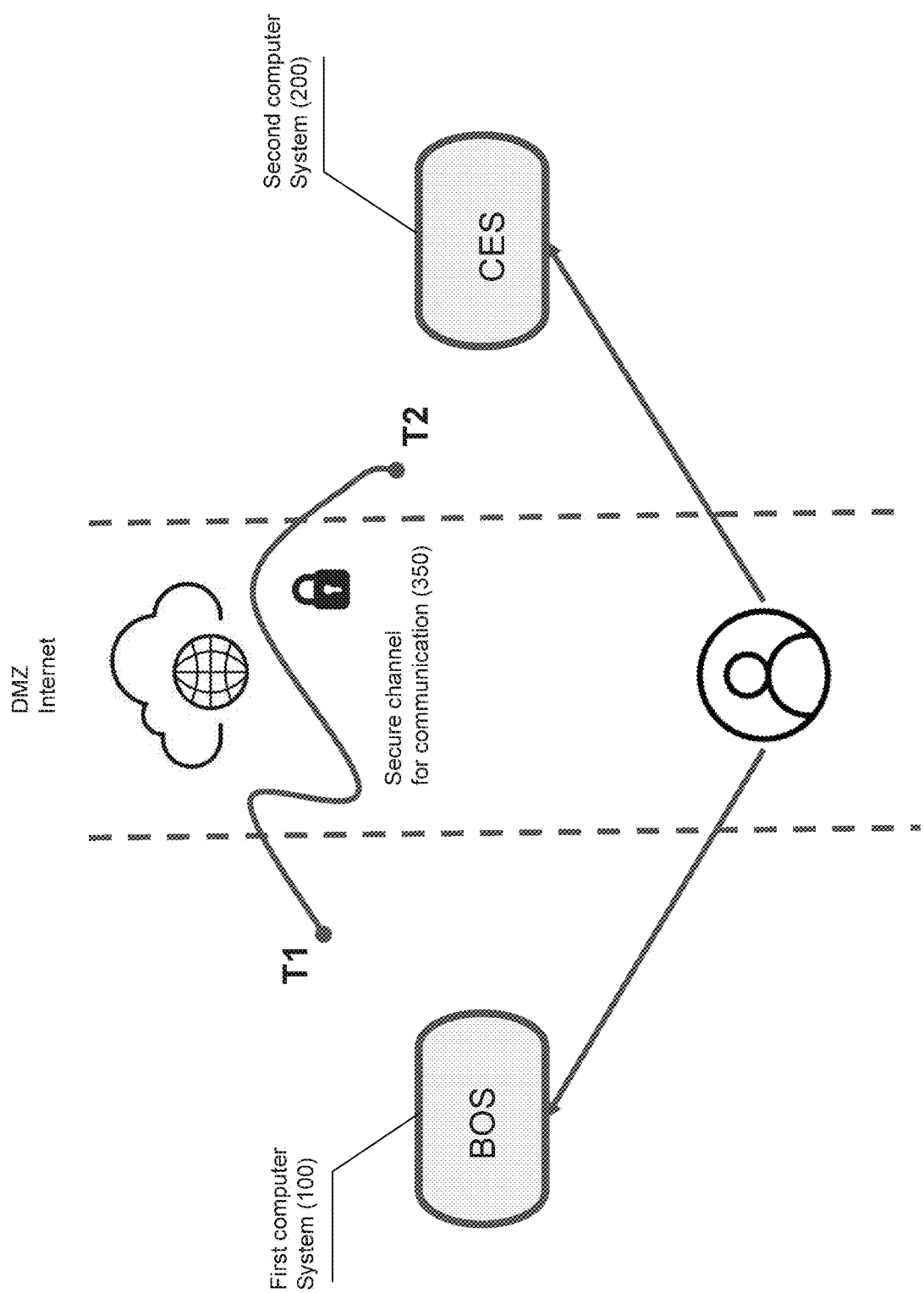
FIG. 8 illustrates two endpoints T1 and T2.
Figure 13:
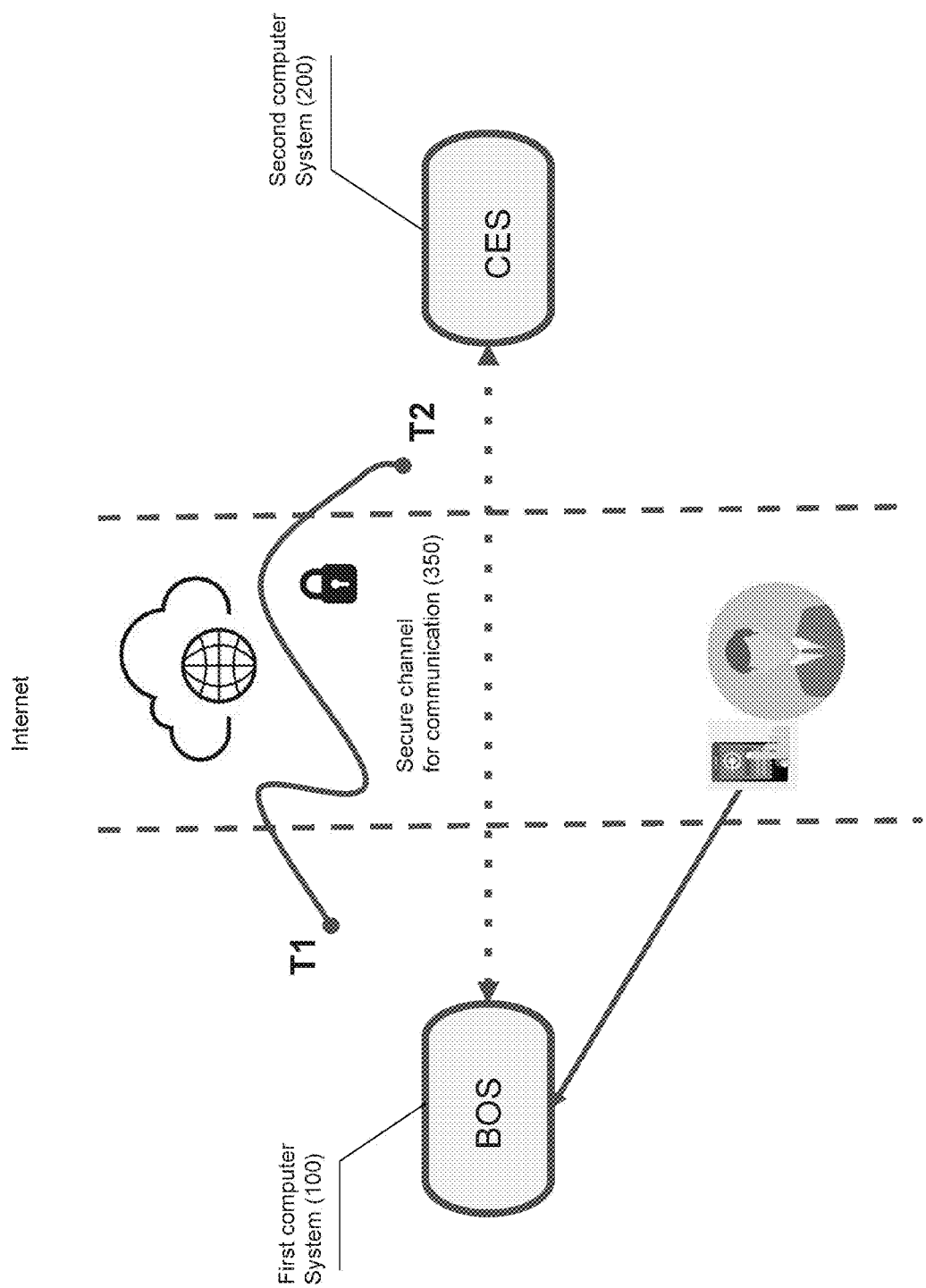
FIGS. 13 and 14 illustrate two endpoints T1 and T2.
Figure 14:
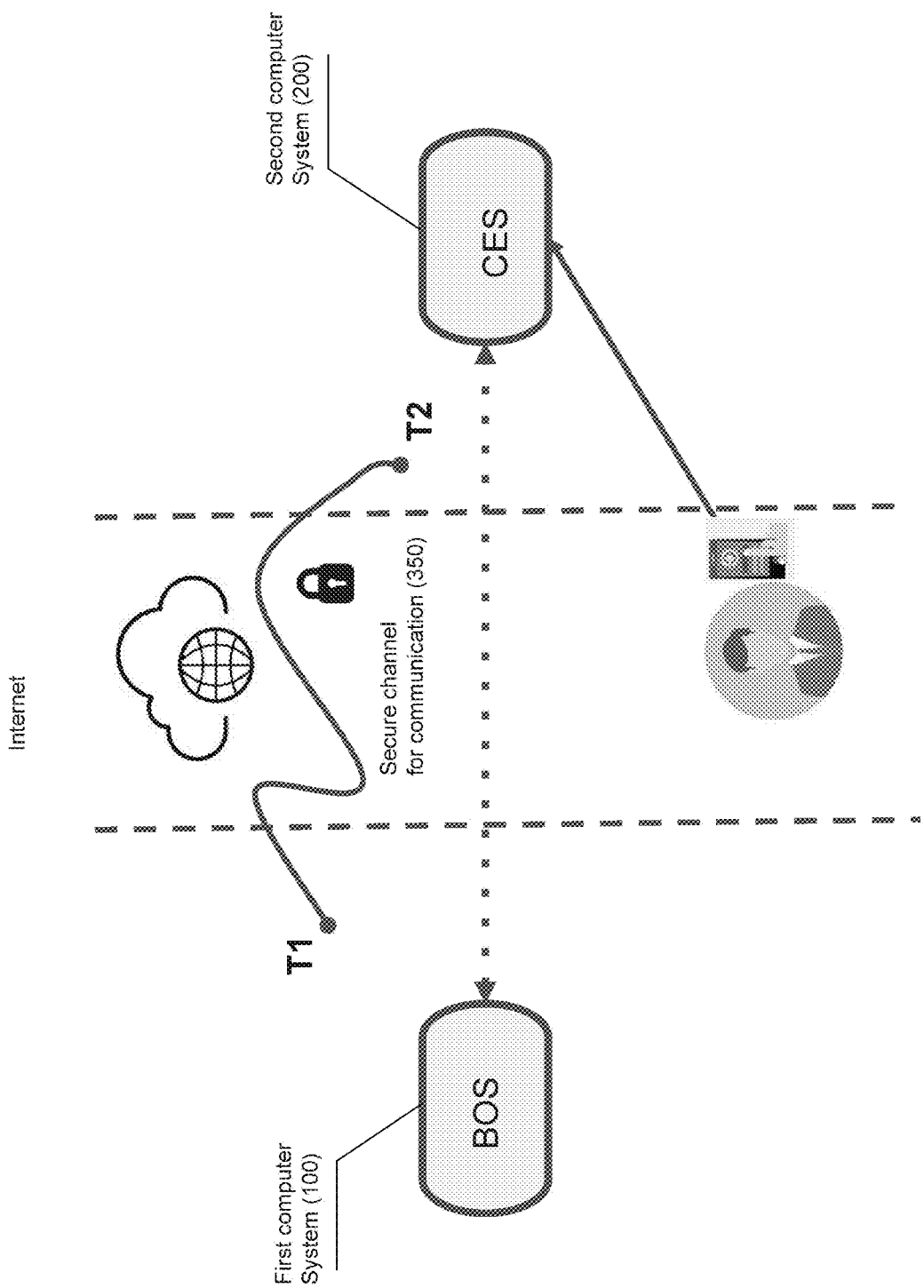

This process and flow is shown in FIG. 7.

Step 1H

The first computer system (100) BOS uses the relevant encryption key: ! KeyID obtains the correct xRef. From table this key is 603. Please see FIG. 10.

encrypt {message< >! keyID}→#[message< >! keyId], which, using the appropriate values, results in:

xRef=encrypt {L3440R< >! 603}→#[L3440R< >! 603]=BX677 xRef=BX677

Step 2H

The first computer system (100) BOS transmits xRef=BX677 to the second computer system (200) CES over the secure channel (350) along with the request ?R_data and it is received by the second computer system (200) CES. The request ?R_data is requesting the unique serial code, request ?R_data=serial code=?

Step 3H

The second computer system (200) CES now uses the procedure to use and find the correct xRef corresponding to the second user ID (210) internal CE_ID (int) by a table look up;

xRef=BX677 gives 65445 as the second user identity (210).

Step 4H

The second computer system (200) CES finds that for user 65445 the last GeoPos for the user was based on serial code=NH55GTDR14423.

Thus the resulting R_data=NH55GTDR14423.

Step 5H

The R_data=NH55GTDR14423 is transmitted to BOS via the secure channel (350) where CE is receiving the last serial code for user with xRef=BX667.

Step 6H

The circle is now "closed" and the first computer system (100) BOS can process what it needs based on the information that it received from the second computer system (200) CES. The first userID (210) BOS_ID=L3440R and therefore the first computer system (100) BOS now updates in its core that serial code NH55GTDR14423 was the code that triggered the last interaction with the second computer system (200) CES.

Further Embodiments of the Invention

In the example embodiment described above, the second computer system BOS was performing an encryption process to/from XRef, and the first computer system CES was holding a reference/lookup table to convert to/from XRef. However in an actual implementation this might be reversed. This choice is a matter of convenience for any given implementation.

In the example above, the first computer system (100) BOS managed encryption keys and an encryption algorithm to bind and convert the first and second user identities (110, 210) via the intermediate user identity (310) xRef.

There are embodiments wherein other but similar bonding techniques can be employed. Which technique that is chosen can depend on efficiency and relevant technical attributes of the two computer systems. In the example an encryption scheme has been used.

Referring to FIG. 11, in an embodiment of the invention a one way function, hashing, is being used, wherein the intermediate user ID (310) xRef is established by hashing with a salt value. An example hashing function is SHA-256.

xRef=hash {message< >salt}→hash

{H7543D< >780}→MN231 xRef=MN231

Another method can be to any xRef lookup value that has a specific bonding by both systems, say using a random string by using a database.

FURTHER CONSIDERATIONS

One of the essential realizations with the current invention is to be able to manage several principally independent user profiles (with its associated data/information) for the same user/individual. It also makes it easier to not duplicate data between computer systems, and only use one master set data for the combined functions.

The current invention obtains two technical features of importance; firstly the user identity does not have to be exchanged between interacting systems, and secondly both (or more) systems can operate and manage combined functionality that depends on managing the combined user profile data as one "virtual" single federated user profile. In other words, without combining and sharing user data the functions in question cannot be made available or operated at all. This further means that one system may process functions within that system based on data that is stored and managed by the other system.

It also follows that, given a set of software/system rules and principles, this type of functions may even create, update or manage data for the user profiles in one or both (or more) systems.

An example of the above;

User BOS_ID (110) in the first computer system (100) contains profile information that the user birth date is 4 Jan. 2012.

The second computer system CES (200) has implemented a combined/federated function where every customer that scans a product item (720) with a serial code, for the next day, and that is under the age of 25 will receive double rewards. The CES_ID (210) user profile has no data on the user's birthdate or age.

When a scan is performed by the second computer system CES (200) it uses the methods described by the current invention, by way of requesting the first computer system BOS (100) to give the second computer systems CES (200) function the age data to process the function so as to determine whether the scan qualifies for a double reward or not. Without the invention and the possibility to exchange this information the function cannot be run. In the example the first computer system BOS (100) holds the data required for the second computer system CES (200) as input data to run a function residing and operated on this second computer system CES (200).

The second computer system CES (200) will now likewise use the current invention to transfer a yes or no message to the first computer system BOS (100) which in turn can update user data accordingly. This example shows that the federated function might even create and manage user profile data in another system BOS (100) than where the function was residing and operated CES (200).

Creation of New User and User Ids

The description above has detailed how the method and system of the invention is used to exchange data such as Latest GeoPosition and/or unique item code (230) between two systems based on referring to a common intermediate userID (310) via the connector engines (500, 600) for already matching userIDs (110, 210).

There are basically two situations where there is a need to establish a "match" in the other system.

The first situation is where a new user and userID is created in one computer system (100, 200) and there is a need to create a corresponding user ID in the other computer system (200, 100). In this case, the algorithm and procedure will give a "null" result in the opposite computer system when performed and no userID exists.

In an embodiment of the invention, in the protocols between the systems there is a procedure to handle this case. The connector engines (500, 600) and procedures can recognize the case as a "new" user. When the "new" procedure is triggered—the other computer system will invoke its own "create new user" and a native user identity is created in the computer system. At the same time the association with the userID in the relevant connector engine will be made—and the user profile might even be populated with data from the requesting system. There are many ways to do this in practice depending on the communication between the systems. One way by example and referring to FIG. 18, the first computer system (100) BOS used its own procedure to create a new first user id (110), in this case R0045R. The connector engine (500) on the first computer system BOS side further creates (or retrieves) encryption key (605) where the encoding gives the result that:

xRef=DF662.

The first computer system (100) BOS sends a "new" user request to the second computer system (200) CES on the other side, including the newly generated intermediate userID (310) xRef. On the other side, the second computer system (200) CES recognizes the "new" user case and invokes its own internal "create new user". That gives a new second UserID (210) to be "61112", please see FIG. 18 left hand side. The binding and entanglement is now imminent and is performed as both the resulting created second userID (210)=61112 and the newly created intermediate userID (310)=DF662 values are inserted into the connector engine (600) at the second computer system (200) CES, in this case as a table update. (The values from this example are marked in bold).

Conversely if the second computer system sends a request to the first computer system (100). Etc. the second user_ID=65545, please see FIG. 18 (values marked with underline), and the intermediary userID=BX677. The first computer system (100) recognizes the «new» user case and invokes its own internal «create new user». This gives a new first UserID (210) to be L3440R.

Another situation is when the two computer systems (100, 200) are being "merged" for the very first time and both computer systems (100, 200) have some individual users (105, 205) of whom several are long time users in both systems. If not using the method explained above, a so-called conversion software and procedure must be programmed and run. Looking at the data structure in both systems and discovering data that enables a certain match can then run the binding and entanglement in batch. In the search for a match to estimate whether a match actually relates to one and the same individual user (105, 205), the initially assumed hits may also be rated with the level of certainty of a correct match if more data elements are used.

By way of example the following case would indicate a match and conversion procedure that is solid.

At the first computer system (100) BOS:
Element 001=email=match mail@gmail.com
Element 002=cell no=2334 445 334 at the second computer system (200) CES:
Element AA=email=match mail@gmail.com
Element BB=cell no=2334 445 334

Evidently resulting in a full rated match. These examples are only illustrations and suggested strategies on how to match corresponding user identities for the first time, however this is left to those skilled in the art as the invention is not concerned or directed at this task.

TABLE OF REFERENCE NUMERALS

| Numeral | Item |
|---|---|
| 100 | First computer system |
| 105 | First user/consumer |
| 110 | First unique user identity |
| 120 | First user profile |
| 200 | Second computer system |
| 205 | Secound user/consumer |
| 210 | Second unique user identity |
| 220 | Second user profile |
| 230 | Unique serial code as registered in the second computer system. |
| 240 | Geolocation |
| 305 | User having common int. user ID (310) |
| 310 | Common intermediary user identity XRef_ID |
| 350 | Secure channel for communication between T1 and T2 |
| 400 | User app |
| 500 | First user_ID connector engine |
| 501 | Interface result |
| 502 | First interface input request |
| 600 | Second user_ID connector engine |
| 602 | |
| 605 | Encryption key |
| 710 | Unique serialized code |
| 720 | Product item |
| 800 | Mutual binding between first and second user identities |

The invention claimed is:

1. A computer implemented method for facilitating secure information exchange between a first computer system and a second computer system, said first computer system being independent from said second computer system,
   wherein said first computer system comprises a first user profile for a corresponding unique and internal first user identity for a corresponding first user,
   wherein said second computer system comprises a second user profile for a corresponding unique and internal second user identity for a corresponding second user,
   wherein said first user and said second user is the same user,
   said computer implemented method comprising:
   generating a unique common intermediary user identification, wherein said first user identity in said first computer system for said same user and said second user identity in said second computer system for said same user are mutually bound via said unique common intermediary user identification;
   resolving/decoding said unique common intermediary user identification to said first user identity by said first computer system
   resolving/decoding said unique common intermediary user identification to said second user identity by said second computer system;
   conducting said information exchange, related to said first user profile of said first user or said second user profile of said second user between said first computer system and said second computer system using said common intermediary user identity that is resolved or decoded respectively by said first computer system and said second computer system, without exchanging said first and second user identities.

2. The computer implemented method of claim 1, further comprising the steps of:
   logging in and communicating, by said same user, via a user app under said first user identity on said first computer system; and
   logging in and communicating, by said same user, via said user app under said second user identity on said second computer system.

3. The computer implemented method of claim 2, further comprising the steps of:
   generating, by said first computer system, a token that is linked with said first user identity,
   transmitting said token from said first computer system to said user app;
   forwarding, by said user app, said token to said second computer system;
   linking, by said second computer system, said token to said second user identity;
   generating, by said second computer system, said unique common intermediary user identification based on said second user identity;
   transmitting, by said second computer system, said unique common intermediary user identification generated by said second computer system and said token to said first computer system;
   receiving, by said first computer system, said unique common intermediary user identification and said token;
   linking, by said first computer system, said unique common intermediary user identification to said first user identity, without mutually exchanging said first and second user identities.

4. The computer implemented method of claim 1, said link between said second user identity via said unique common intermediary user identification to said first user identity named a mutual binding.

5. The computer implemented method of claim 1, wherein a first connector engine is arranged with said first computer system for receiving said unique common intermediary user identification and converting said unique common intermediary user identification or associating said unique common intermediary user identification to said first user entity.

6. The computer implemented method of claim 5, wherein a second connector engine is arranged with said second computer system for converting said second user identity to said unique common intermediary user identification.

7. The computer implemented method of claim 5, wherein said first connector engine is arranged with said first computer system for receiving said first user identity and converting said first user identity to said unique common intermediary user identification.

8. The computer implemented method of claim 6, wherein said second connector engine is arranged with said second computer system for receiving said common intermediary user identification and converting said unique common intermediary user identification to said second user identity.

9. The computer implemented method of claim 1, comprising, when said unique common intermediary user identification is established, communicating part of said second user profile, except said second user identity, with said unique common intermediary user identification from said second computer system via a secure channel to said first computer system, and using said part of said second user profile in said first user profile.

10. The computer implemented method of claim 1, wherein said unique common intermediary user identification is encoded.

11. The computer implemented method of claim 1, wherein said unique common intermediary user identification is encrypted.

12. The computer implemented method of claim 1, wherein said first computer system is a brand owner system.

13. The computer implemented method of claim 1, wherein said second computer system comprises a track and trace system.

14. The computer implemented method of claim 1, further comprising scanning a serialized code from a product item and communicating said serialized code while logged in as said second user identity to said second computer system.

* * * * *